US010857675B2

(12) United States Patent
Kobayashi

(10) Patent No.: US 10,857,675 B2
(45) Date of Patent: Dec. 8, 2020

(54) CONTROL DEVICE, ROBOT, AND ROBOT SYSTEM

(71) Applicant: Seiko Epson Corporation, Tokyo (JP)

(72) Inventor: Masakazu Kobayashi, Shiojiri (JP)

(73) Assignee: Seiko Epson Corporation

( * ) Notice: Subject to any disclaimer, the term of this patent is extended or adjusted under 35 U.S.C. 154(b) by 305 days.

(21) Appl. No.: 15/440,367

(22) Filed: Feb. 23, 2017

(65) Prior Publication Data

US 2017/0246745 A1    Aug. 31, 2017

(30) Foreign Application Priority Data

Feb. 25, 2016    (JP) .................................. 2016-034275

(51) Int. Cl.
*B25J 9/16*       (2006.01)
*B25J 13/08*      (2006.01)

(52) U.S. Cl.
CPC ............ *B25J 9/1697* (2013.01); *B25J 9/161* (2013.01); *B25J 9/1612* (2013.01); *B25J 13/085* (2013.01); *G05B 2219/37555* (2013.01); *G05B 2219/39446* (2013.01); *G05B 2219/39466* (2013.01); *Y10S 901/31* (2013.01); *Y10S 901/47* (2013.01)

(58) Field of Classification Search
CPC . B25J 9/1697; B25J 9/085; B25J 9/161; B25J 9/1612; B25J 9/1679; G05B 2219/37555; G05B 2219/39446; G05B 2219/39466; G05B 2219/45097; Y10S 901/47; Y10S 901/31
See application file for complete search history.

(56) References Cited

U.S. PATENT DOCUMENTS

| 4,593,452 | A | * | 6/1986 | Keahey | ................ | H01B 13/012 140/92.1 |
| 5,887,122 | A | * | 3/1999 | Terawaki | ............. | B23K 9/1274 700/258 |
| 2005/0143861 | A1 | * | 6/2005 | Watanabe | .............. | B25J 9/1684 700/264 |
| 2006/0009878 | A1 | * | 1/2006 | Kobayashi | ............. | B25J 9/1671 700/245 |
| 2006/0069464 | A1 | * | 3/2006 | Nagatsuka | ........... | G05B 19/425 700/253 |
| 2009/0125146 | A1 | * | 5/2009 | Zhang | .................... | B25J 9/1664 700/253 |
| 2014/0277732 | A1 | * | 9/2014 | Shiota | .................... | B25J 9/1697 700/259 |

(Continued)

FOREIGN PATENT DOCUMENTS

JP    S61-231604 A      10/1986
JP    S61231604 A   *  10/1986

(Continued)

OTHER PUBLICATIONS

English Translation for reference JPS61231604A (Year: 1986).*

*Primary Examiner* — Rachid Bendidi

(74) *Attorney, Agent, or Firm* — Harness, Dickey & Pierce, P.L.C.

(57) ABSTRACT

A control device includes a control section configured to control a robot on the basis of first information concerning positions and sequential numbers for drawing a linear object around a first object. The first information is received by a receiving section and displayed on a display section.

8 Claims, 16 Drawing Sheets

(56) References Cited

U.S. PATENT DOCUMENTS

| | | | |
|---|---|---|---|
| 2015/0239121 A1* | 8/2015 | Takeda | B25J 9/1605 700/250 |
| 2015/0246449 A1 | 9/2015 | Sakai et al. | |
| 2015/0273689 A1* | 10/2015 | Ouchi | B25J 9/161 700/257 |
| 2016/0030134 A1* | 2/2016 | Shapter | G06F 3/0488 606/130 |

FOREIGN PATENT DOCUMENTS

| | | |
|---|---|---|
| JP | S61-279480 A | 12/1986 |
| JP | 2004-005049 A | 1/2004 |
| JP | 2011-005612 A | 1/2011 |
| JP | 2015-160305 A | 9/2015 |
| JP | 2015-182213 A | 10/2015 |

* cited by examiner

CONTROL DEVICE, ROBOT, AND ROBOT SYSTEM

BACKGROUND

1. Technical Field

The present invention relates to a control device, a robot, and a robot system.

2. Related Art

Researches and developments for a technique for causing a user to easily draw around a cable have been performed.

Concerning the technique, there is known a robot having structure capable of causing a user to easily perform work for drawing around a cable (see JP-A-2015-160305 (Patent Literature 1)).

However, even with such a robot, since the cable is manually drawn around, it is sometimes difficult to improve work efficiency. A state of the manually drawn-around cable sometimes fluctuates depending on a skill of a person who has drawn around the cable. In particular, when the cable is not skillfully drawn around, it is likely that a deficiency occurs in the cable.

SUMMARY

An aspect of the invention is directed to a control device including a control section configured to control a robot on the basis of first information concerning positions and sequential numbers for drawing a linear object around a first object. The first information is received by a receiving section and displayed on a display section.

With this configuration, the control device controls the robot on the basis of the first information concerning the positions and the sequential numbers for drawing the linear object around the first object. Consequently, the control device can easily perform work for drawing around the linear object.

Another aspect of the invention is directed to the control device, in which the display section displays a picked-up image of the first object picked up by an image pickup section, and the receiving section receives the first information on the basis of the picked-up image displayed on the display section.

With this configuration, the control device controls the robot on the basis of the first information received on the basis of the picked-up image displayed on the display section. Consequently, the control device can easily perform, on the basis of the first information received on the basis of the picked-up image displayed on the display section, the work for drawing around the linear object.

Another aspect of the invention is directed to the control device, in which the display section displays a model of the first object, and the receiving section receives the first information on the basis of the model displayed on the display section.

With this configuration, the control device controls the robot on the basis of the first information received on the basis of the model displayed on the display section. Consequently, the control device can easily perform, on the basis of the first information received on the basis of the model displayed on the display section, the work for drawing around the linear object.

Another aspect of the invention is directed to the control device, in which a track of the robot is generated by a track generating section on the basis of the first information, the track includes a curve, and the control section controls the robot on the basis of the track.

With this configuration, the control device controls the robot on the basis of the track of the robot generated on the basis of the first information. Consequently, the control device can easily perform, on the basis of the track of the robot generated on the basis of the first information, the work for drawing around the linear object.

Another aspect of the invention is directed to the control device, in which the receiving section receives second information concerning a minimum curvature of the curve, and the curve may not include a curve having a curvature smaller than the minimum curvature.

With this configuration, the control device controls the robot on the basis of the first information and the second information. Consequently, the control device can easily perform, on the basis of the first information and the second information, the work for drawing around the linear object.

Another aspect of the invention is directed to the control device, in which the receiving section receives third information concerning a gripping force with which the robot grips the linear object.

With this configuration, the control device controls the robot on the basis of the first information and the third information. Consequently, the control device can easily perform, on the basis of the first information and the third information, the work for drawing around the linear object.

Another aspect of the invention is directed to the control device, in which the receiving section receives fourth information concerning a re-gripping position when the robot re-grips the linear object.

With this configuration, the control device controls the robot on the basis of the first information and the fourth information. Consequently, the control device can easily perform, on the basis of the first information and the fourth information, the work for drawing around the linear object.

Another aspect of the invention is directed to the control device, in which the robot includes a force detector, and the control section is capable of changing tension of the linear object on the basis of an output of the force detector.

With this configuration, the control device changes the tension of the linear object on the basis of the output of the force detector. Consequently, the control device can easily perform, on the basis of the first information and the output of the force detector, the work for drawing around the linear object.

Another aspect of the invention is directed to the control device, in which the display section displays an interference position of the robot and the first object based on a simulation result obtained when the robot operates on the basis of the first information.

With this configuration, the control device controls the robot on the basis of the interference position of the robot and the first object displayed on the display section. Consequently, the control device can easily perform, on the basis of the first information and the interference position of the robot and the first object, the work for drawing around the linear object.

Another aspect of the invention is directed to a robot controlled by the control device described above.

With this configuration, the robot draws the linear object around the first object on the basis of the first information. Consequently, the robot can easily perform the work for drawing around the linear object.

Another aspect of the invention is directed to a robot system including: the control device described above; and a robot controlled by the control device.

With this configuration, the robot system draws the linear object around the first object on the basis of the first information. Consequently, the robot system can easily perform the work for drawing around the linear object.

As explained above, the control device, the robot, and the robot system draw the linear object around the first object on the basis of the first information. Consequently, the control device, the robot, and the robot system can easily perform the work for drawing around the linear object.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment

An embodiment of the invention is explained below with reference to the drawings.

Configuration of a Robot System

First, the configuration of a robot system 1 is explained.

Figure 1:
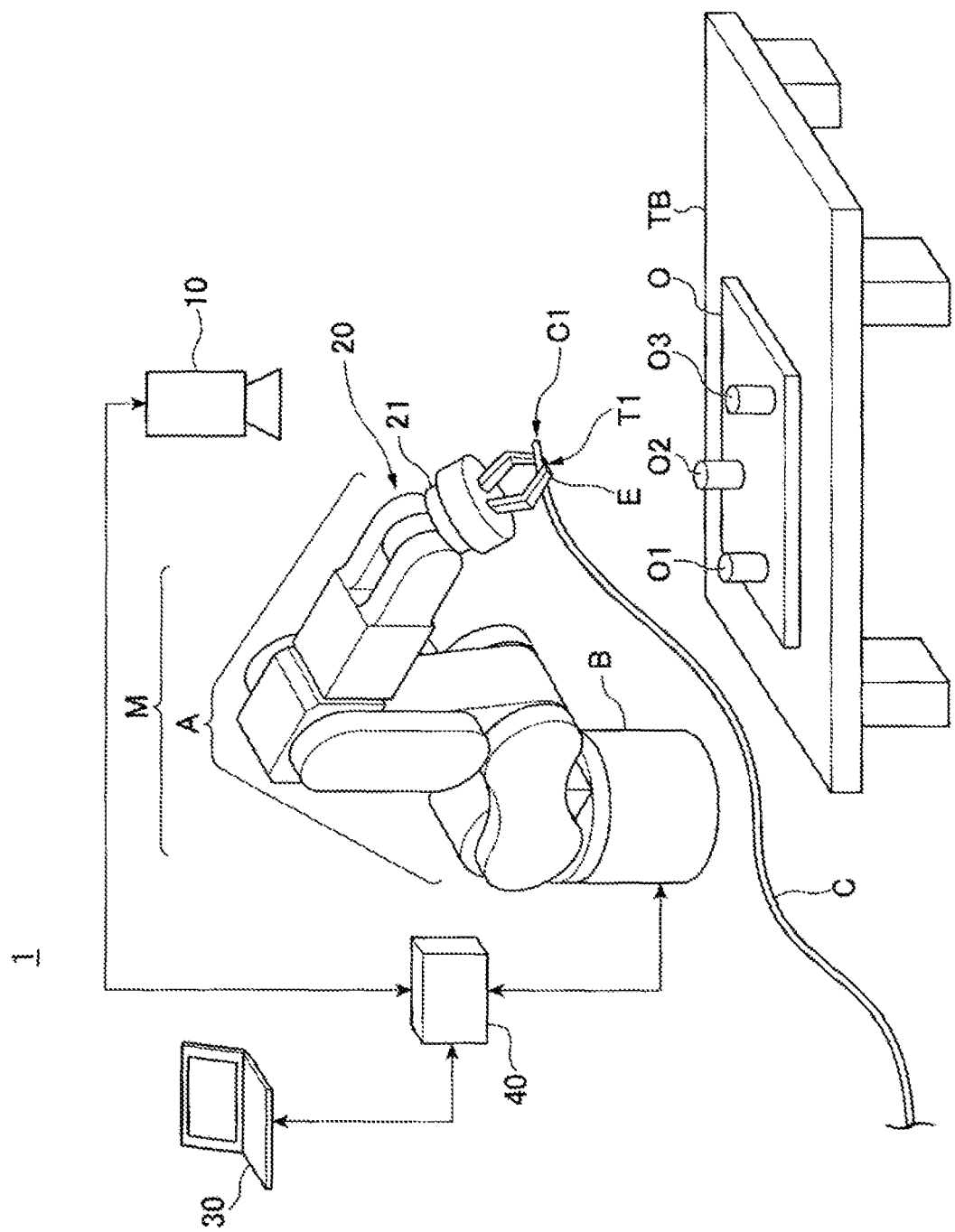
FIG. 1 is a diagram showing an example of the configuration of a robot system according to an embodiment.

FIG. 1 is a diagram showing an example of the configuration of the robot system 1 according to this embodiment. The robot system 1 includes an image pickup section 10, a robot 20, an information processing device 30, and a control device 40.

The image pickup section 10 is a camera including for example, a CCD (Charge Coupled Device) or a CMOS (Complementary Metal Oxide Semiconductor), which is an image pickup device that converts condensed light into an electric signal. In this example, the image pickup section 10 is set in a position where the image pickup section 10 is capable of picking up an image of a range including a region where the robot 20 is capable of performing work.

The image pickup section 10 is communicatively connected to the control device 40 by a cable. Wired communication via the cable is performed according to a standard such as the Ethernet (registered trademark) or the USB (Universal Serial Bus). Note that the image pickup section 10 may be connected to the control device 40 by wireless communication performed according to a communication standard such as the Wi-Fi (registered trademark).

The robot 20 is a single-arm robot including an arm A and a supporting stand B that supports the arm A. The single-arm robot is a robot including one arm like the arm A in this example. Note that the robot 20 may be a plural-arm robot instead of the single-arm robot, may be a linear motion robot such as a gantry robot, or may be a SCARA robot, or may be another robot. The plural-arm robot is a robot including two or more arms (e.g., two or more arms A). Note that, among plural arm robots, a robot including two arms is referred to as double-arm robot as well. That is, the robot 20 may be a double-arm robot including two arms or may be a plural-arm robot including three or more arms (e.g., three or more arms A).

The arm A includes an end effector E, a manipulator M, and a force detecting section 21.

The end effector E is an end effector that grips an object. In this example, the end effector E includes finger sections and pinches and holds an object with the finger sections to grip the object. Note that, instead of this, the end effector E may be configured to lift an object with the suction of the air, a magnetic force, another jig, or the like to thereby grip the object. That is, in this example, gripping means changing an object to a state in which the object can be lifted.

The end effector E is communicatively connected to the control device 40 by a cable. Consequently, the end effector E performs a motion based on a control signal acquired from the control device 40. Note that wired communication via the cable is performed according to a standard such as the Ethernet (registered trademark) or the USB. The end effector E may be connected to the control device 40 by wireless communication performed according to a communication standard such as the Wi-Fi (registered trademark).

The manipulator M includes seven joints. The seven joints respectively include not-shown actuators. That is, the arm A including the manipulator M is an arm of a seven-axis vertical multi-joint type. Note that the arm A may be, instead of the arm, an arm of a seven-axis horizontal multi-joint type. The arm A performs a motion of a seven-axis degree of freedom according to associated operation by the supporting stand B, the end effector E, the manipulator M, and the actuators of the respective seven joints included in the manipulator M. Note that the arm A may move at a degree of freedom of six or less axes or may move at a degree of freedom of eight or more axes.

When the arm A moves at the seven-axis degree of freedom, postures that the arm A can take increases compared with when the arm A moves at the degree of freedom of six or less axes. Consequently, the arm A can smoothly move and easily avoid interference with an object present around the arm A. When the arm A moves at the seven-axis degree of freedom, computational complexity of the control of the arm A is small and the control of the arm A is easy compared with when the arm A moves at the degree of freedom of eight or more exes.

The seven actuators (included in the joints) included in the manipulator M are respectively communicatively connected to the control device 40 by cables. Consequently, the actuators operate the manipulator M on the basis of a control signal acquired from the control device 40. Note that the wired communication via the cable is performed according to a standard such as the Ethernet (registered trademark) or the USB. Apart or all of the seven actuators included in the manipulator M may be connected to the control device 40 by wireless communication performed according to a communication standard such as the Wi-Fi (registered trademark).

The force detecting section 21 is provided between the end effector E and the manipulator M. The force detecting section 21 is, for example, a force sensor. The force detecting section 21 detects a force and a moment (torque) applied to the end effector E or an object gripped by the end effector E. The force detecting section 21 outputs force detection information including, as output values, values indicating the magnitudes of the detected force and the detected moment to the control device 40 through communication.

The force detection information is used for control based on force detection information of the arm A by the control device 40. The control based on the force detection information means compliant motion control such as impedance control. Note that the force detecting section 21 may be another sensor that detects the values of the magnitudes of the force and the moment applied to the end effector E or the object gripped by the end effector E such as a torque sensor.

The force detecting section 21 is communicatively connected to the control device 40 by a cable. Wired communication via the cable is performed according to a standard such as the Ethernet (registered trademark) or the USB. Note that the force detecting section 21 and the control device 40 may be connected by wireless communication performed according to a communication standard such as the Wi-Fi (registered trademark).

In this example, the control device 40 is a robot controller (a robot control device). The control device 40 sets a control point T1, which is a TCP (Tool Center Point) moving together with the end effector E, in a predetermined position of the end effector E. For example, the predetermined position is a position on a rotation axis of the actuators of the manipulator M that rotates the end effector E and is a position apart from the center of gravity of the end effector E to the side of the finger sections of the end effector E by a predetermined distance. Note that the predetermined position may be, instead of the position, another position associated with the end effector E. The predetermined distance is, for example, a distance along the rotation axis from, of end portions of the finger sections, end portions on the opposite side of the manipulator M to the center of gravity. Note that, instead of the distance, the predetermined distance may be another distance.

Control point position information, which is information indicating the position of the control point T1, and control point posture information, which is information indicating the posture of the control point T1, are associated with the control point T1. Note that, in addition to these kinds of information, other kinds of information may be associated with the control point T1. When the control device designates (determines) the control point position information and the control point posture information, the position and the posture of the control point T1 are determined. The control device 40 designates the control point position information and operates the arm A such that the position of the control point T1 coincides with a position indicated by the designated control point position information. The control device 40 designates the control point posture information and operates the arm A such that the posture of the control point T1 coincides with a posture indicated by the designated control point posture information.

In this example, the position of the control point T1 is represented by a position in a robot coordinate system RC of the origin of a control point coordinate system TC1, which is a three-dimensional local coordinate system associated with the control point T1 to move together with the control point T1. The posture of the control point T1 is represented by the directions of coordinate axes of the control point coordinate system TC1.

The control device 40 sets the control point T1 on the basis of control point setting information input from the user in advance. The control point setting information is, for example, information indicating relative positions and relative postures of the position and the posture of the center of gravity of the end effector E and the position and the posture of the control point T1. Note that the control point setting information may be, instead of the information, information indicating relative positions and relative postures of some position and posture associated with the end effector E and the position and the posture of the control point T1 or may be information indicating relative positions and relative postures of some position and posture associated with the manipulator M and the position and the posture of the control point T1.

The control device 40 acquires via-point information from the information processing device 30. The via-point information is information indicating via-points. The via-points are a plurality of points through (via) which the control device 40 causes the control point T1 to pass when operating the arm A. Via-point position information, via-point posture information, via-point sequential number information, via-point speed information, and via-point gripping force information are associated with the via-points. The via-point position information is information indicating the positions of the via-points. The via-point posture information is information indicating the postures of the via-points. The via-point sequential number information is information indicating sequential numbers associated with the via-points. The via-point speed information is information indicating speeds associated with the via-points. The speeds are speeds for moving the control point T1 (or the end effector E). The via-point gripping force information is information indicating gripping forces associated with the via-points. The gripping forces are forces with which the finger sections of the end effector E grip an object.

In this example, the positions of the via-points are represented by positions in the robot coordinate system. RC of the origin of a via-point coordinate system, which is a three-dimensional local coordinate system associated with the via-points. The postures of the via-points are represented by the directions of coordinate axes of the via-point coordinate system.

The control device 40 designates the control point position information and the control point posture information and operates the arm A to match the position and the posture of the control point T1 and the position and the posture of a via-point to thereby match the control point T1 and the via-point. The control device 40 matches the control point T1 with the via-points in order on the basis of the sequential numbers of the via-points. The control device 40 determines, on the basis of the speeds of the via-points, speeds of the control point T1 passing the via-points. The control device 40 determines, on the basis of gripping forces of the via-points, gripping forces with which the end effector E grips an object when the control point T1 passes the via-points. Consequently, the control device 40 operates the arm A and changes the position and the posture of the end effector E.

The control device 40 generates, on the basis of the acquired via-point information, a control signal including a signal for controlling the actuators of the manipulator M to match the control point T1 with the via-points. The control signal includes other signals such as a signal for moving the finger sections of the end effector E. The control device 40 transmits the generated control signal to the robot 20 and causes the robot 20 to perform predetermined work.

In this example, the control device 40 is set on the outside of the robot 20. Note that the control device 40 may be incorporated in the robot 20 instead of being set on the outside of the robot 20.

The information processing device 30 is, for example, a notebook PC (Personal Computer). Note that the information processing device 30 may be, instead of the notebook PC, another information processing device such as a teaching pendant, a desktop PC, a tablet PC, a multifunction cellular phone terminal (a smartphone), a cellular phone terminal, or a PDA (Personal Digital Assistant).

In this example, the information processing device 30 displays a teaching screen on which the user inputs teaching points. The teaching points are points used by the information processing device 30 to generate via-point information. Teaching point position information, teaching point posture information, teaching point sequential number information, teaching point speed information, and teaching point gripping force information are associated with the teaching points. The teaching point position information is information indicating the positions of the teaching points. The teaching point posture information is information indicating the postures of the teaching points. The teaching point sequential number information is information indicating sequential numbers associated with the teaching points. The teaching point speed information is information indicating speeds associated with the teaching points. The teaching point gripping force information is information indicating gripping forces associated with the teaching points. The information processing device 30 receives these kinds of information input from the teaching screen by the user. The information processing device 30 generates the teaching points based on the received information. The information processing device 30 generates via-point information on the basis of the generated teaching points. The information processing device 30 outputs the generated via-point information to the control device 40.

The information processing device 30 is communicatively connected to the control device 40 by a cable. Wired communication via the cable is performed according to a standard such as the Ethernet (registered trademark) or the USB (Universal Serial Bus). Note that the information processing device 30 and the control device 40 may be connected by wireless communication performed according to a communication standard such as the Wi-Fi (registered trademark). The information processing device 30 may be configured integrally with the control device 40. In this case, the control device 40 has functions of the information processing device 30 explained below.

Overview of the Predetermined Work Performed by the Robot

An overview of the predetermined work performed by the robot 20 is explained below.

The robot 20 performs, as the predetermined work, work for drawing a linear object around an object. In this example, the work for drawing the linear object around the object means work for attaching (disposing) the linear object to (in) the object while pulling the linear object along a via-point track corresponding to the object. The via-point track is a track obtained by connecting via-points, which are indicated by the via-point information generated by the information processing device 30, in the order of the sequential numbers of the via-points with a line. In this example, the line is a straight line. Note that the line may include a curve. Examples of work for attaching the linear object to the object while pulling the linear object include work for wiring (disposing) a cable, which is an example of the linear object, on a housing while hooking the cable on one or more cable clamps provided on a wall surface on a housing inside of some apparatus.

The linear object is an object that can be bent without being fractured. For example, the linear object is a cable for communication, a cable for power feeding, another wire, a pipe, or a tube of an organism such as a blood vessel. In the following explanation, as an example, the linear object is a cable C shown in FIG. 1. An object around which the linear object is drawn is, for example, an industrial device such as a printer or a projector or a component of the device, a daily device not for an industrial purpose or a component of the device, or an organism such as an organ. In the following explanation, as an example, the object is a first object O shown in FIG. 1.

In this example, the first object O is placed on the upper surface of a workbench TB as shown in FIG. 1. The first object O is a tabular object and is an object, on the upper surface of which three columnar protrusion sections O1 to O3 are formed. Each of the protrusion sections O1 to O3 is a part for hooking the cable C when the cable C is drawn around the first object O. Note that the shape of the first object O may be another shape instead of such a shape. The shape of a part or all of the protrusion sections O1 to O3 may be another shape instead of the columnar shape. In this example, the workbench TB is a table. Note that the workbench TB may be another object instead of the table as long as the object is an object on which the first object O can be disposed such as a floor surface or a shelf.

In this example, the robot 20 grips one end portion C1 of two end portions of the cable C in advance. Note that the predetermined work may include a motion for gripping the cable C placed in a predetermined cable storage place.

The robot 20 matches, on the basis of a control signal acquired from the control device 40, the via-points and the control point T1 in the order of the sequential numbers of the via-points to thereby move the end effector E that is gripping the end portion C1. Consequently, the robot 20 attaches the cable C to the first object O while pulling the cable C along a via-point track based on the via-point information acquired from the information processing device 30 by the control device 40. That is, the robot 20 draws the cable C around the first object O on the basis of the via-point information acquired from the control device 40.

Figure 2:
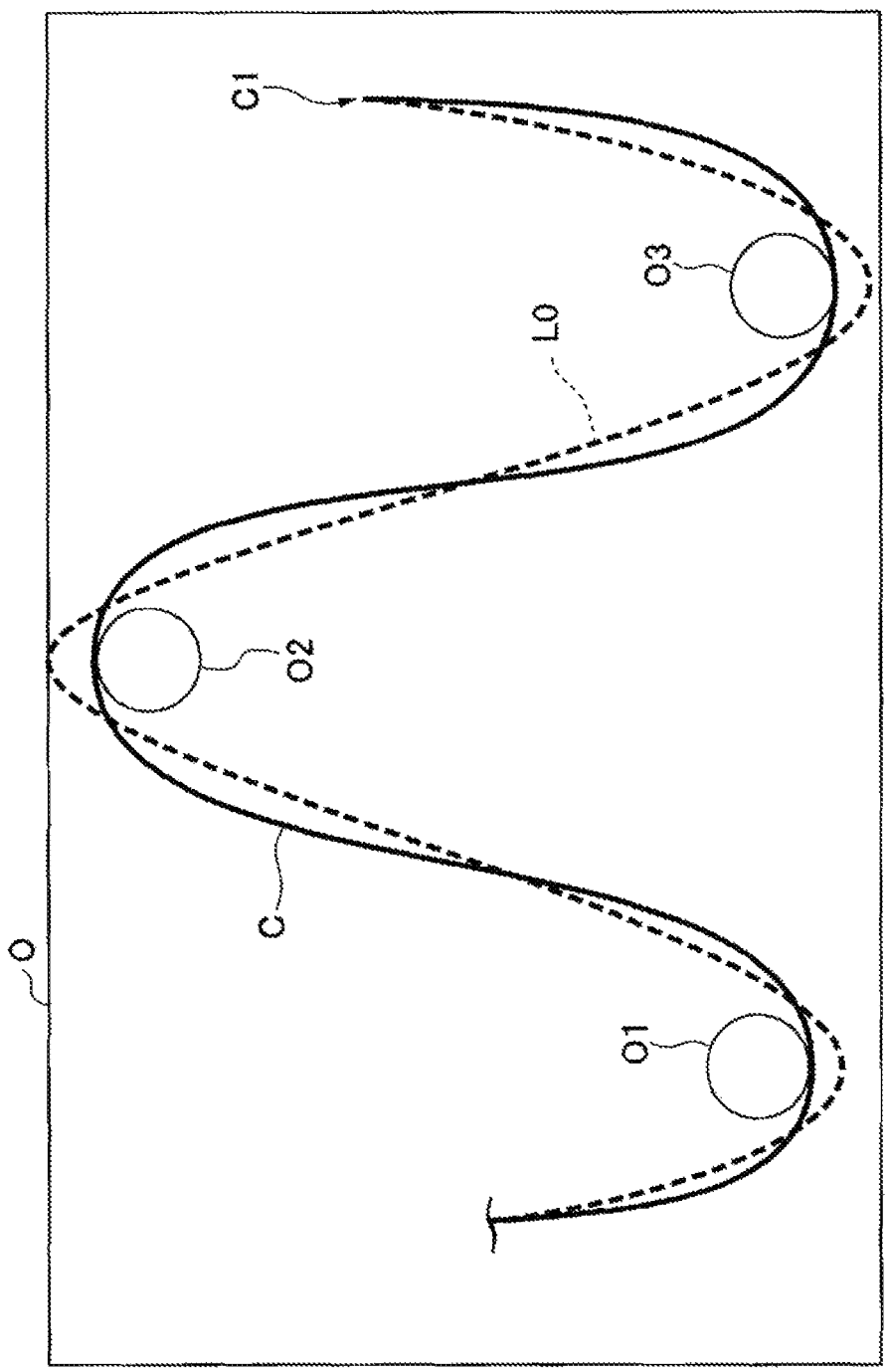
FIG. 2 is an example of a top view of a first object.

The predetermined work performed by the robot 20 is explained with reference to FIG. 2. FIG. 2 is an example of a top view of the first object O. For example, the robot 20 pulls, along a via-point track L0 shown in FIG. 2, the cable C, the end portion C1 of which is gripped by the end effector E. The robot 20 attaches the cable C to the first object O while hooking the cable C on the respective protrusion sections O1 to O3. The cable C after being drawn around the robot 20 warps (loosens) unless the robot 20 pulls the cable C to thereby apply tension to the cable C. Therefore, the cable C is not always attached completely along the via-point track L0 by being drawn around by the robot 20 and is attached to deviate from the via-point track L0. In the example shown in FIG. 2, the cable C is attached to deviate from the via-point track L0 in this way. As explained above, the robot 20 performs, as the predetermined work, the work for drawing the cable C around the first object O. Note that the predetermined work may be, instead of the work, another kind of work performed while pulling the cable C along some via-point track.

Overview of Processing in which the Information Processing Device Generates Via-Point Information An overview of processing in which the information processing device 30 generates via-point information is explained.

The teaching point position information, the teaching point posture information, the teaching point sequential number information, the teaching point speed information, and the teaching point gripping force information are input to the information processing device 30 from the displayed teaching screen by the user. The information processing device 30 generates teaching points on the basis of input these kinds of information. The information processing device 30 generates via-point information on the basis of the generated teaching points.

Specifically, the information processing device 30 calculates a provisional track on the basis of the generated teaching points. The provisional track is a track represented, on the basis of a method of calculating a free curve, by a free curve obtained by connecting teaching points in the order of the sequential numbers of the teaching points with a line. Note that the provisional track is an example of a track. In the following explanation, as an example, the free curve is a Bézier curve. In this case, three or more teaching points are necessary. Note that the free curve may be, instead of the Bézier curve, another curve based on teaching points such as a spline curve.

The information processing device 30 generates via-point information on the basis of the calculated provisional track. Specifically, the information processing device 30 generates, on the basis of a predetermined condition, a predetermined number N of via-points such that the via-points are located apart from one another at equal intervals on the provisional track. The predetermined condition is that, in this example, the predetermined number N of via-points to be generated includes via-points respectively coinciding with the teaching points. Note that the predetermined condition may be or may not be another condition. The teaching points and the via-points coinciding with each other means that, in this example, information associated with the teaching points and information associated with the via-points coincide with each other. In the following explanation, for convenience of explanation, the via-points coinciding with the teaching points in this way are referred to as coinciding points and explained. The predetermined number N is, for example, one hundred. Note that, instead of one hundred, the predetermined number N may be another number.

The information processing device 30 calculates, on the basis of the postures of the coinciding points, postures of the via-points that are not the coinciding points among the generated via-points. For example, the information processing device 30 calculates postures of the via-points included between a first coinciding point and a second coinciding point such that a change amount of the postures from the posture of the first coinciding point to the posture of the second coinciding point and a sum of change amounts of the postures among the via-points from the first coinciding point to the second coinciding point coincide with each other. The information processing device 30 associates the postures calculated concerning the respective via-points, which are not the coinciding points among the generated via-points, with the respective via-points.

The information processing device 30 calculates, on the basis of the speeds of the coinciding points, speeds of the via-points that are not the coinciding points among the generated via-points. For example, the information processing device 30 calculates speeds of the via-points included between the first coinciding point and the second coinciding point such that a change amount of the speeds from the speed of the first coinciding point to the speed of the second coinciding point and a sum of change amounts of the speeds among the via-points from the first coinciding point to the second coinciding point coincide with each other. The information processing device 30 associates the speeds calculated concerning the respective via-points, which are not the coinciding points among the generated via-points, with the respective via-points.

The information processing device 30 calculates, on the basis of gripping forces of the coinciding points, gripping forces of the via-points that are not the coinciding points among the generated via-points. For example, the information processing device 30 calculates gripping forces of the via-points included between the first coinciding point and the second coinciding point such that a change amount of the gripping forces from the gripping force of the first coinciding point to the gripping force of the second coinciding point and a sum of change amounts of the gripping forces among the via-points from the first coinciding point to the second coinciding point coincide with each other. The information processing device 30 associates the gripping forces calculated concerning the respective via-points, which are not the coinciding points among the generated via-points, with the respective via-points.

The information processing device 30 calculates sequential numbers of the generated via-points on the basis of the sequential numbers of the coinciding points. For example, when the predetermined number N is one hundred, the information processing device 30 specifies the sequential number of a first coinciding point as first and associates the sequential numbers in order from the via-point adjacent to the first coinciding point to the last coinciding point such that the sequential number of the coinciding point having the last sequential number is one hundred-th.

In this way, the teaching points smaller in number than the number of the via-points are input from the user, whereby the information processing device 30 generates the via-points for causing the robot 20 to perform work for drawing around the cable C. The information processing device 30 generates the via-point information indicating the generated via-points. The information processing device 30 outputs the via-point information to the control device 40. Consequently, by using the information processing device 30, the user can easily cause the robot 20 to perform the work for drawing around the cable C.

Note that one or all of the teaching point posture information, the teaching point speed information, and the teaching point gripping force information do not have to be input to the information processing device 30 from the teaching screen by the user. In this case, the teaching point position information and the teaching point sequential number information are input to the information processing device 30 from the teaching screen by the user as information concerning positions and sequential numbers for drawing the cable C around the first object O. The information processing device 30 generates teaching points on the basis of the input teaching point position information and the input teaching point sequential number information. The information processing device 30 generates via-point information on the basis of the generated teaching points. The teaching point position information and the teaching point posture information are examples of first information.

In this example, the teaching point position information indicates positions respectively in an X-axis direction, a Y-axis direction, and a Z-axis direction in the robot coordinate system RC. When the information indicating these three positions is input by the user as the teaching point position information, all of the three positions may be collectively input to the information processing device 30 or the three positions may be separately input to the information processing device 30. In the following explanation, as an example, the three positions are separately input to the information processing device 30.

Overview of Processing Performed by the Control Device

An overview of processing performed by the control device 40 is explained below.

The control device 40 acquires the via-point information from the information processing device 30. The control device 40 controls the robot 20 on the basis of the acquired via-point information. In other words, the control device 40 controls the robot 20 on the basis of the teaching point position information and the teaching point posture information received by the information processing device 30 or the provisional track generated on the basis of the teaching point position information and the teaching point posture information and causes the robot 20 to the perform predetermined work. Consequently, the control device 40 can easily perform the work for drawing around the cable C. Since the control device 40 causes the robot 20 to draw around the cable C, even when the robot 20 performs the predetermined work on a respective plurality of first objects O, the control device 40 can keep fixed quality without causing a state of the cable C drawn around each of the first objects O to fluctuate. As a result, the control device 40 can suppress possibility of occurrence of a deficiency due to the fluctuation of the state.

In this embodiment, the processing in which the information processing device 30 generates the via-point information and the processing in which the control device 40 causes the robot 20 to perform the predetermined work are explained in detail.

Figure 3:
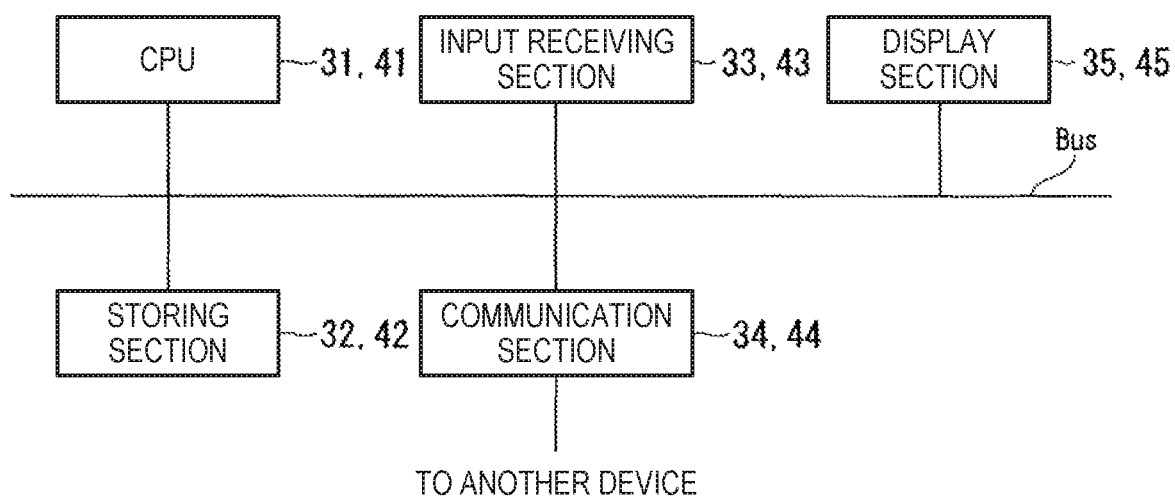
FIG. 3 is a diagram showing an example of a hardware configuration of an information processing device and a control device.

Hardware Configuration of the Information Processing Device and the Control Device A hardware configuration of the information processing device 30 and the control device 40 is explained below with reference to FIG. 3. FIG. 3 is a diagram showing an example of the hardware configuration of the information processing device 30 and the control device 40. FIG. 3 is a diagram showing a hardware configuration of the information processing device 30 (functional sections added with reference numerals in thirties) and a hardware configuration of the control device 40 (functional sections added with reference numerals in fortieth) together for convenience.

The information processing device 30 includes, for example, a CPU (Central Processing Unit) 31, a storing section 32, an input receiving section 33, a communication section 34, and a display section 35. The information processing device 30 performs communication with the control device 40 via the communication section 34. These components are communicatively connected to one another via a bus Bus.

The control device 40 includes, for example, a CPU 41, a storing section 42, an input receiving section 43, a communication section 44, and a display section 45. The control device 40 performs communication with the robot 20 and the information processing device 30 via the communication section 44. These components are communicatively connected to one another via the bus Bus.

The CPU 31 executes various computer programs stored in the storing section 32.

The storing section 32 includes, for example, a HDD (Hard Disk Drive) or an SSD (Solid State Drive), an EEPROM (Electrically Erasable Programmable Read-Only Memory), a ROM (Read-Only Memory), or a RAM (Random Access Memory). Note that the storing section 32 may be, instead of a storing section incorporated in the information processing device 30, an external storage device connected by, for example, a digital input/output port such as the USB. The storing section 32 stores various kinds of information and images to be processed by the information processing device 30 and the computer programs.

The input receiving section 33 is, for example, a touch panel configured integrally with the display section 35. Note that the input receiving section 33 may be a keyboard, a mouse, a touch pad, or another input device.

The communication section 34 includes, for example, a digital input/output port such as the USB or the Ethernet (registered trademark) port.

The display section 35 is, for example, a liquid crystal display panel or an organic EL (Electro Luminescence) display panel.

The CPU 41 executes various computer programs stored in the storing section 42.

The storing section 42 includes, for example, a HDD or an SSD, an EEPROM, a ROM, or a RAM. Note that the storing section 42 may be, instead of a storing section incorporated in the control device 40, an external storage device connected by, for example, a digital input/output port such as the USB. The storing section 42 stores various kinds of information and images to be processed by the control device 40 and the computer programs.

The input receiving section 43 is, for example, a touch panel configured integrally with the display section 45. Note that the input receiving section 43 may be a keyboard, a mouse, a touch pad, or another input device.

The communication section 44 includes, for example, a digital input/output port such as the USB or the Ethernet (registered trademark) port.

The display section 45 is, for example, a liquid crystal display panel or an organic EL display panel.

Figure 4:
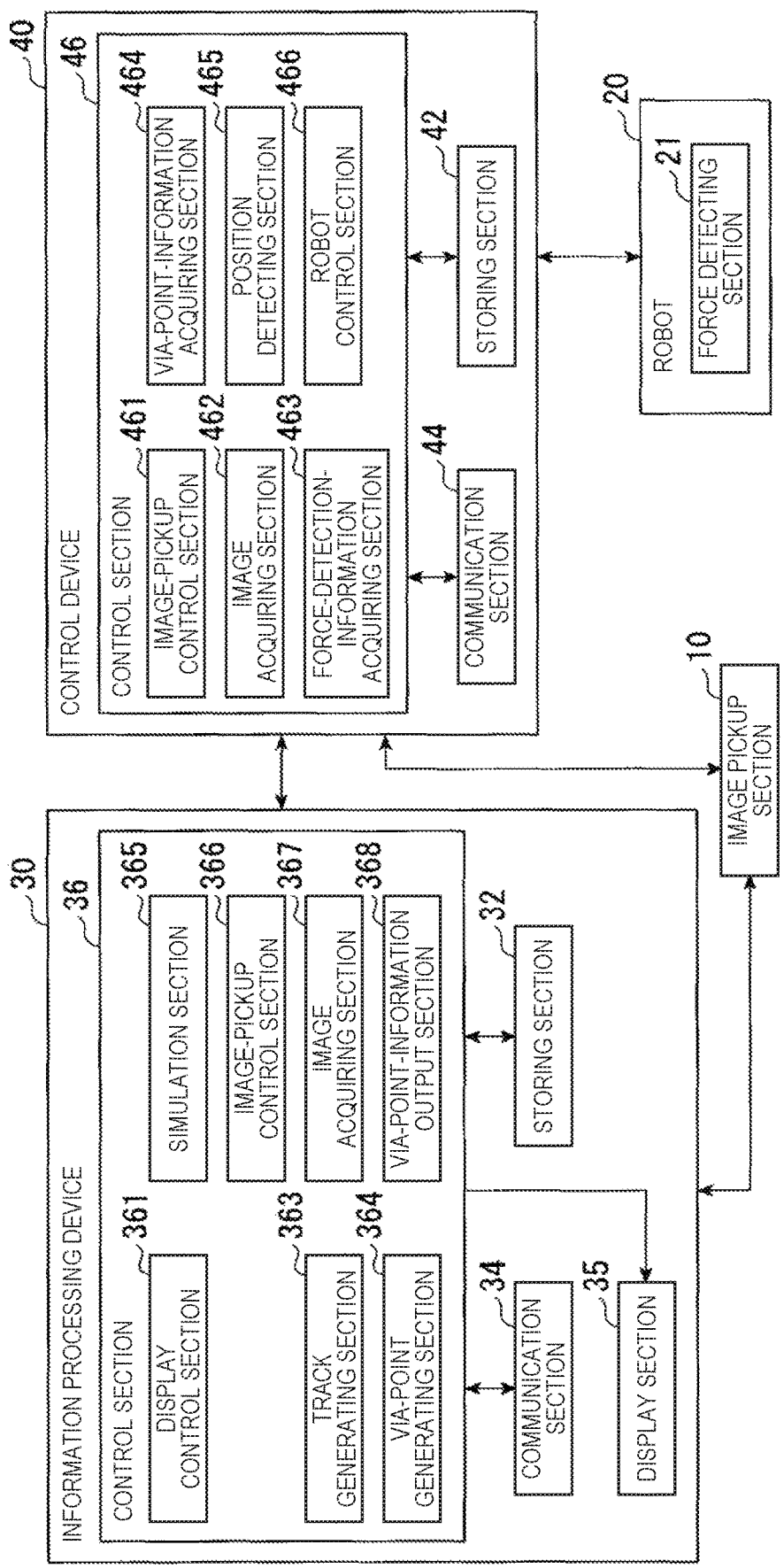
FIG. 4 is a diagram showing an example of a functional configuration of the information processing device and the control device.

Functional Configuration of the Information Processing Device and the Control Device A functional configuration of the information processing device 30 and the control device 40 is explained below with reference to FIG. 4. FIG. 4 shows an example of the functional configuration of the information processing device 30 and the control device 40.

The information processing device 30 includes the storing section 32, the communication section 34, the display section 35, and a control section 36.

The control section 36 controls the entire information processing device 30. The control section 36 includes a display control section 361, a track generating section 363, a via-point generating section 364, a simulation section 365, an image-pickup control section 366, an image acquiring section 367, and a via-point-information output section 368. These functional sections included in the control section 36 are realized by, for example, the CPU 31 executing the various computer programs stored in the storing section 32. A part or all of the functional sections may be hardware functional sections such as an LSI (Large Scale Integration) and an ASIC (Application Specific Integrated Circuit).

The display control section 361 generates various screens that the display control section 361 causes the display section 35 to display. The display control section 361 causes the display section 35 to display the generated screens.

The track generating section 363 generates a provisional track on the basis of teaching points input (received) from the user by the input receiving section 33.

The via-point generating section 364 generates via-points on the basis of the provisional track generated by the track generating section 363. The via-point generating section 364 generates, on the basis of the generated via-points, via-point information indicating the via-points.

The simulation section 365 executes a simulation based on the via-points generated by the via-point generating section 364. The simulation is processing for causing a virtual robot 20 in a virtual space V to perform operation in the case in which the robot 20 performs the predetermined work on the basis of the via-points generated by the via-point generating section 364. The virtual space V is a virtual space virtually including objects related to the predetermined work of the robot 20 in a real space such as the first object O. Coordinates indicating positions in the virtual space V are associated with coordinates indicating positions in the robot coordinate system RC by calibration. Coordinates indicating positions in the robot coordinate system RC are associated with coordinates indicating positions in the real world (a world coordinate system) by calibration. The simulation section 365 causes, with the display control section 361, the display section 35 to display a moving image indicating a result of the executed simulation.

The image-pickup control section 366 causes the image pickup section 10 to pick up an image of a range in which the image pickup section 10 is capable of performing image pickup.

The image acquiring section 367 acquires, from the image pickup section 10, the picked-up image picked up by the image pickup section 10.

The via-point-information output section 368 outputs, with the communication section 34, the via-point information generated by the via-point generating section 364 to the control device 40.

The control device 40 includes the storing section 42, the communication section 44, and a control section 46.

The control section 46 controls the entire control device 40. The control section 46 includes an image-pickup control section 461, an image acquiring section 462, a force-detection-information acquiring section 463, a via-point-information acquiring section 464, a position detecting section 465, and a robot control section 466. These functional sections included in the control section 46 are realized by, for example, the CPU 41 executing the various computer programs stored in the storing section 42. A part or all of the functional sections may be hardware functional sections such as an LSI or an ASIC.

The image-pickup control section 461 causes the image pickup section 10 to pick up an image of a range in which the image pickup section 10 is capable of performing image pickup.

The image acquiring section 462 acquires, from the image pickup section 10, the picked-up image picked up by the image pickup section 10.

The force-detection-information acquiring section 463 acquires force detection information from the force detecting section 21.

The via-point-information acquiring section 464 acquires via-point information from the information processing device 30.

The position detecting section 465 detects various positions on the basis of the picked-up image acquired by the image acquiring section 462.

The robot control section 466 operates the robot 20 on the basis of the via-point information acquired by the via-point-information acquiring section 464 and causes the robot 20 to perform the predetermined work.

Figure 5:
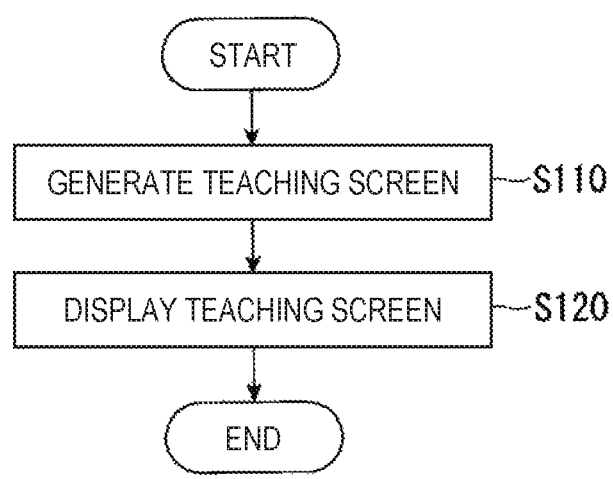
FIG. 5 is a flowchart for explaining an example of a flow of processing in which the information processing device displays a teaching screen.

Processing in which the Information Processing Device Displays a Teaching Screen Processing in which the information processing device 30 displays a teaching screen is explained below with reference to FIG. 5. FIG. 5 is a flowchart for explaining an example of a flow of the processing in which the information processing device 30 displays a teaching screen.

The display control section 361 reads out teaching screen information from the storing section 32. The teaching screen information is information necessary for generating a teaching screen and is, for example, information configured by the HTML (HyperText Markup Language) or the CSS (Cascading Style Sheets). The teaching screen information is information stored in the storing section 32 in advance. The display control section 361 generates a teaching screen on the basis of the teaching screen information read out from the storing section 32 (step S110). Subsequently, the display control section 361 causes the display section 35 to display the teaching screen generated in step S110 (step S120) and ends the processing.

Figure 6:
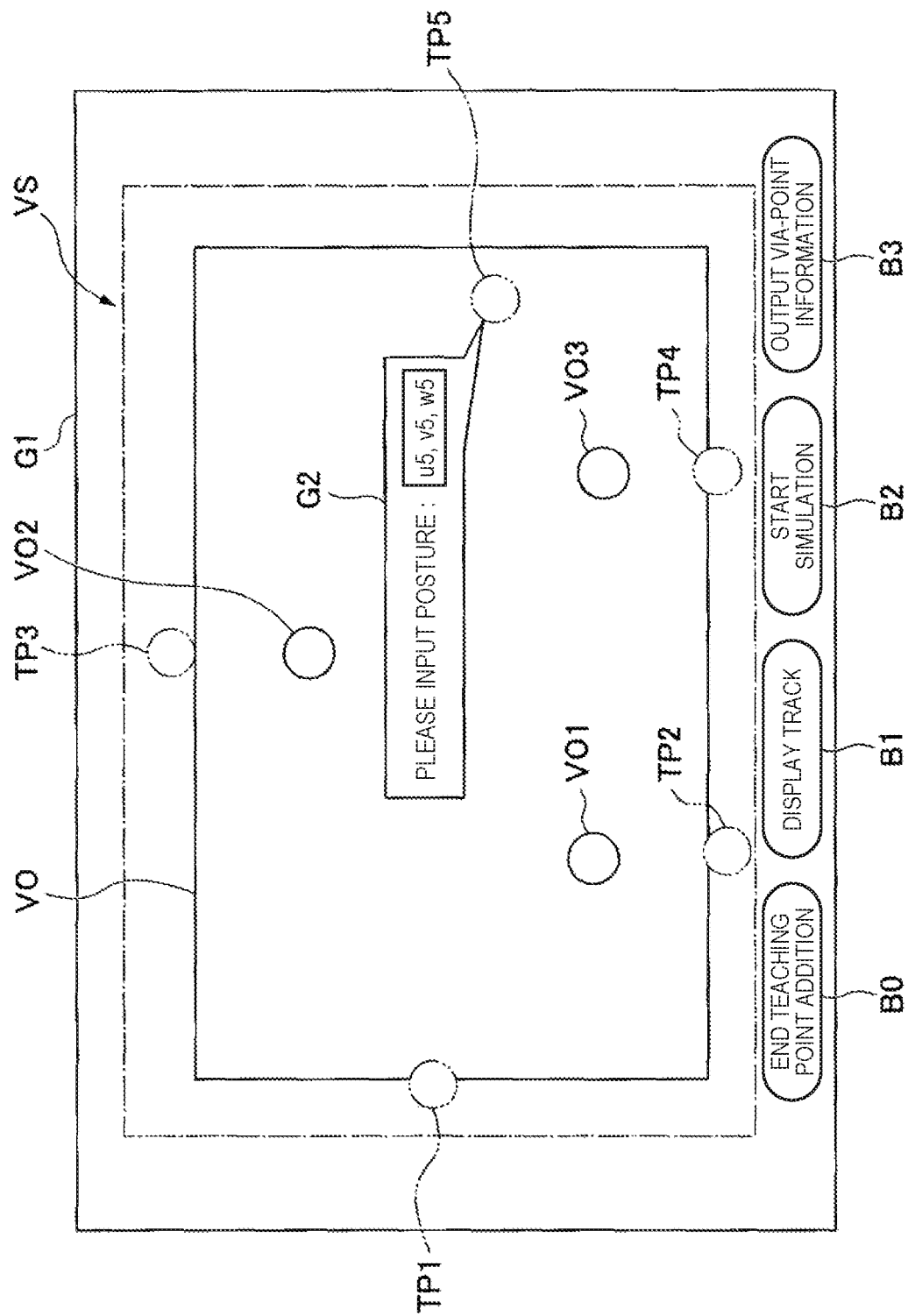
FIG. 6 is a diagram showing an example of the teaching screen.

Processing Performed by the Information Processing Device on the Basis of Operation Performed by the User on the Teaching Screen The teaching screen and processing performed by the information processing device on the basis of operation performed by the user are explained below with reference to FIGS. 6 to 12. FIG. 6 is a diagram showing an example of the teaching screen. A teaching screen G1 shown in FIG. 6 includes a virtual space display region VS, a button B0, a button B1, a button B2, and a button B3. Note that the teaching screen G1 may include other GUIs (Graphical User Interfaces) in addition to the virtual space display region VS, the button B0, the button B1, the button B2, and the button B3.

The virtual space display region VS is a region where the virtual space V is displayed. The display control section 361 generates the virtual space V on the basis of information input by the user in advance. The information is information indicating the shapes, the positions, and the like of objects disposed in the virtual space V. The display control section 361 causes the display section 35 to display the generated virtual space V in the virtual space display region VS. The virtual space V in this example includes a first object VO, which is a virtual first object O, as shown in FIG. 6. The first object VO includes virtual protrusion sections VO1 to VO3 corresponding to respective protrusion sections O1 to O3 included in the first object O in the real space. That is, the shape of the first object VO is the same as the shape of the first object O.

The display control section 361 causes the display section 35 to display, in the virtual space display region VS, the inside of the virtual space V seen when the inside of the virtual space is viewed from a visual point based on operation on the touch panel (the input receiving section 33) of the information processing device 30. In FIG. 6, the inside of the virtual space V seen when the inside of the virtual space V is viewed from a visual point located right above the upper surface of the first object VO toward the center of gravity of the first object VO is displayed. In this example, in a default state, the display control section 361 causes the display section 35 to display, in the virtual space display region VS, the inside of the virtual space V seen when the inside of the virtual space V is viewed from the visual point toward the center of gravity. In this example, the default state means a state before operation on the touch panel after the display of the teaching screen G1. Therefore, a range including the upper surface of the first object VO in the virtual space V is displayed in the virtual space display region VS shown in FIG. 6. Note that, in the default state, the display control section 361 may cause the display section 35 to display, in the virtual space display region VS, the inside of the virtual space V seen when the inside of the virtual space is viewed from a visual point in a position different from the visual point described above toward the center of gravity.

Figure 7:
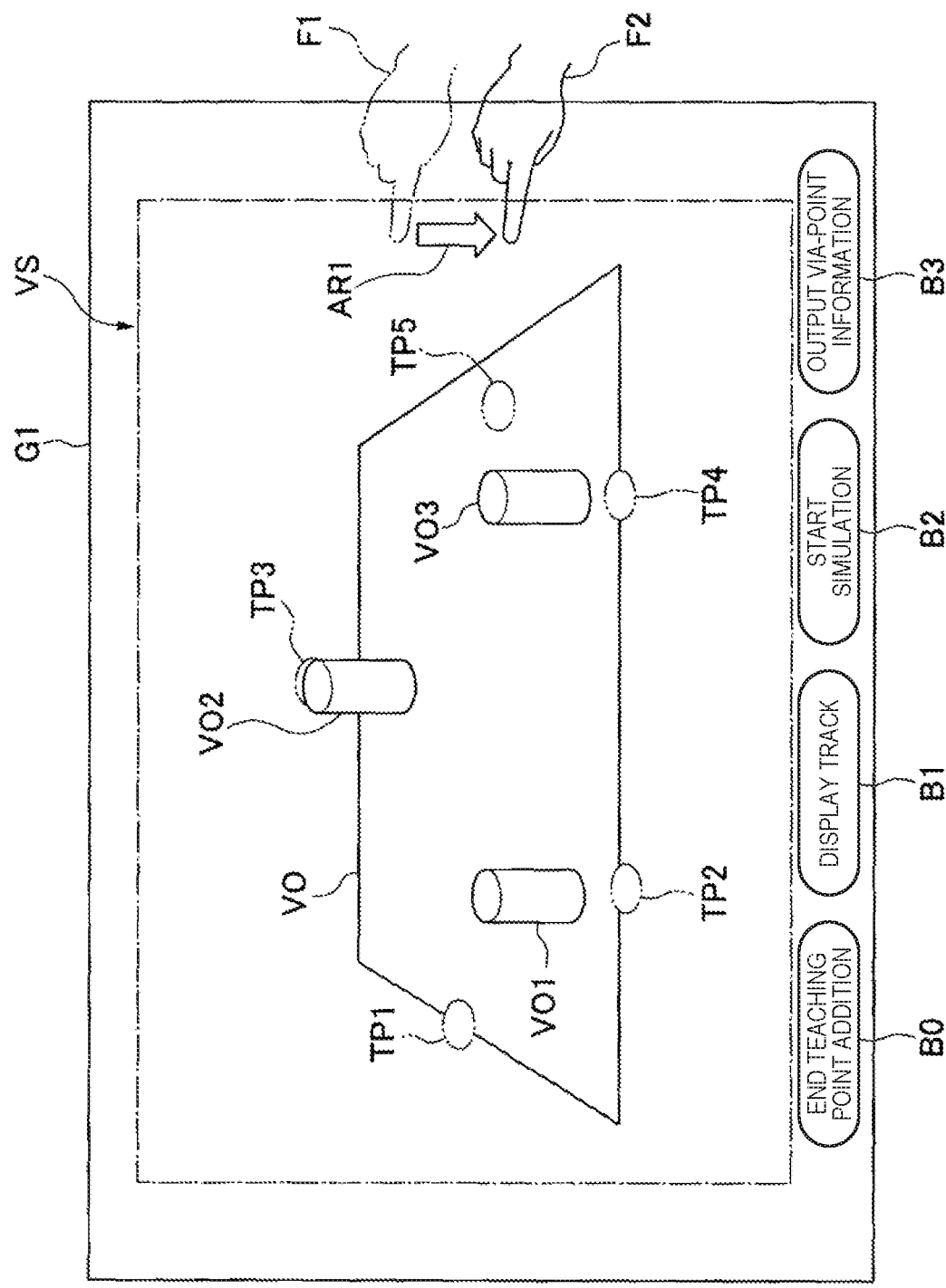
FIG. 7 is a diagram showing an example of a state in which a visual point based on operation on a touch panel of the information processing device is changed according to touch operation on the touch panel.

On the teaching screen G1, the visual point based on the operation on the touch panel of the information processing device 30 can be changed according to touch operation on the touch panel. FIG. 7 is a diagram showing an example of a state in which the visual point based on the operation on the touch panel of the information processing device 30 is changed according to touch operation on the touch panel. For example, as shown in FIG. 7, when the touch panel is swiped in a direction AR1 indicated by an arrow shown in FIG. 7, the display control section 361 moves the visual point in a direction opposite to the direction AR1. The display control section 361 causes the display section 35 to display, in the virtual space display region VS, the inside of the virtual space V seen when the inside of the virtual space V is viewed from the moved visual point toward the center of gravity of the first object VO. In FIG. 7, a finger F1 indicates the position of a finger of the user before the swiping and a finger F2 indicates the position of the finger of the user after the swiping. Note that the display control section 361 calculates, on the basis of a distance of the swiping performed on the touch panel, a movement amount for moving the visual point by performing the swiping. According to the movement of the visual point, the display control section 361 can cause the display section 35 to display, in the virtual space display region VS, the inside of the virtual space V seen when the user views the inside of the virtual space V from a desired visual point toward the center of gravity of the first object VO.

Note that the display control section 361 may cause the display section 35 to display, in the virtual space display region VS, a picked-up image picked up by the image pickup section 10 instead of causing the display section 35 to display the virtual space V in the virtual space display region VS. In this case, the display control section 361 causes, with the image-pickup control section 461, the image pickup section 10 to pick up an image of an image pickup range in which the image pickup section 10 is capable of performing image pickup. The display control section 361 acquires, with the image acquiring section 462, from the image pickup section 10, the picked-up image picked up by the image pickup section 10. The display control section 361 causes the display section 35 to display the acquired picked-up image in the virtual space display region VS. Note that, in this case, unlike when causing the display section 35 to display the virtual space V in the virtual space display region VS, the display control section 361 does not perform the movement of the visual point based on the operation on the touch panel of the information processing device 30 explained with reference to FIG. 7.

The user can add (input or generate), by tapping the virtual space display region VS, teaching points in positions in the virtual space V indicated by tapped positions. When the virtual space display region VS is tapped by the user, the display control section 361 generates, in the positions in the virtual space V indicated by the tapped positions, teaching points associated with teaching point position information indicating the positions. The positions are positions in the X-axis direction and the Y-axis direction of the robot coordinate system RC associated with positions in the X-axis direction and the Y-axis direction in the virtual space V. In this example, as explained above, positions in the Z-axis direction of the robot coordinate system RC are associated with the teaching points later. Note that, in this example, the X-axis direction and the Y-axis direction in the virtual space V are directions along the upper surface of the first object VO.

In order to inform the user that the teaching points are generated, the display control section 361 adds (causes the display section 35 to display), on the basis of the positions in the X-axis direction and the Y-axis direction of the robot coordinate system RC associated with the generated teaching points, information representing the teaching points in the positions in the X-axis direction and the Y-axis direction in the virtual space V associated with the positions. In the example shown in FIGS. 6 and 7, the information representing the teaching points added (displayed) in the virtual space V is represented by respective circles TP1 to TP5 of alternate long and two short dashes lines. Note that the information may be other information including marks such as star marks or flashing of light.

In this example, the display control section 361 stores the number of times the teaching points are generated by the tap by the user, sets a number obtained by adding one to the stored number of times as a sequential number, and associates the sequential number with a teaching point generated anew. Note that an initial value of the number of times is zero. The display control section 361 initializes the number of times to the initial value every time a teaching screen is generated. For example, when generating the teaching point represented by the circle TP1 first, the display control section 361 associates teaching point sequential number information indicating the first with the teaching point.

After adding (causing the display section 35 to display) the information representing the teaching points in the virtual space V, the display control section 361 causes the display section 35 display, on the virtual space V displayed in the virtual space display region VS, a posture input screen for inputting teaching point posture information indicating the postures of the teaching points represented by the added (displayed) information. In the example shown in FIG. 6, after causing the display section 35 to display the circle TP5 in the virtual space display region VS, the display control section 361 displays a posture input screen G2 on the virtual space V displayed in the virtual space display region VS. The user can associate, using the posture input screen G2, a desired posture with the teaching point represented by the circle TP5. That is, the display control section 361 associates teaching point posture information received from the posture input screen G2 with the teaching point represented by the circle TP5. After the teaching point posture information is input to the posture input screen G2 by the user, the display control section 361 deletes the posture input screen G2 from the virtual space display region VS. For example, when the posture input screen G2 is tapped twice within a predetermined time, the display control section 361 determines that the input of the teaching point posture information to the posture input screen G2 has ended. The predetermined time is, for example, approximately one second. Note that the predetermined time may be another time.

Figure 8:
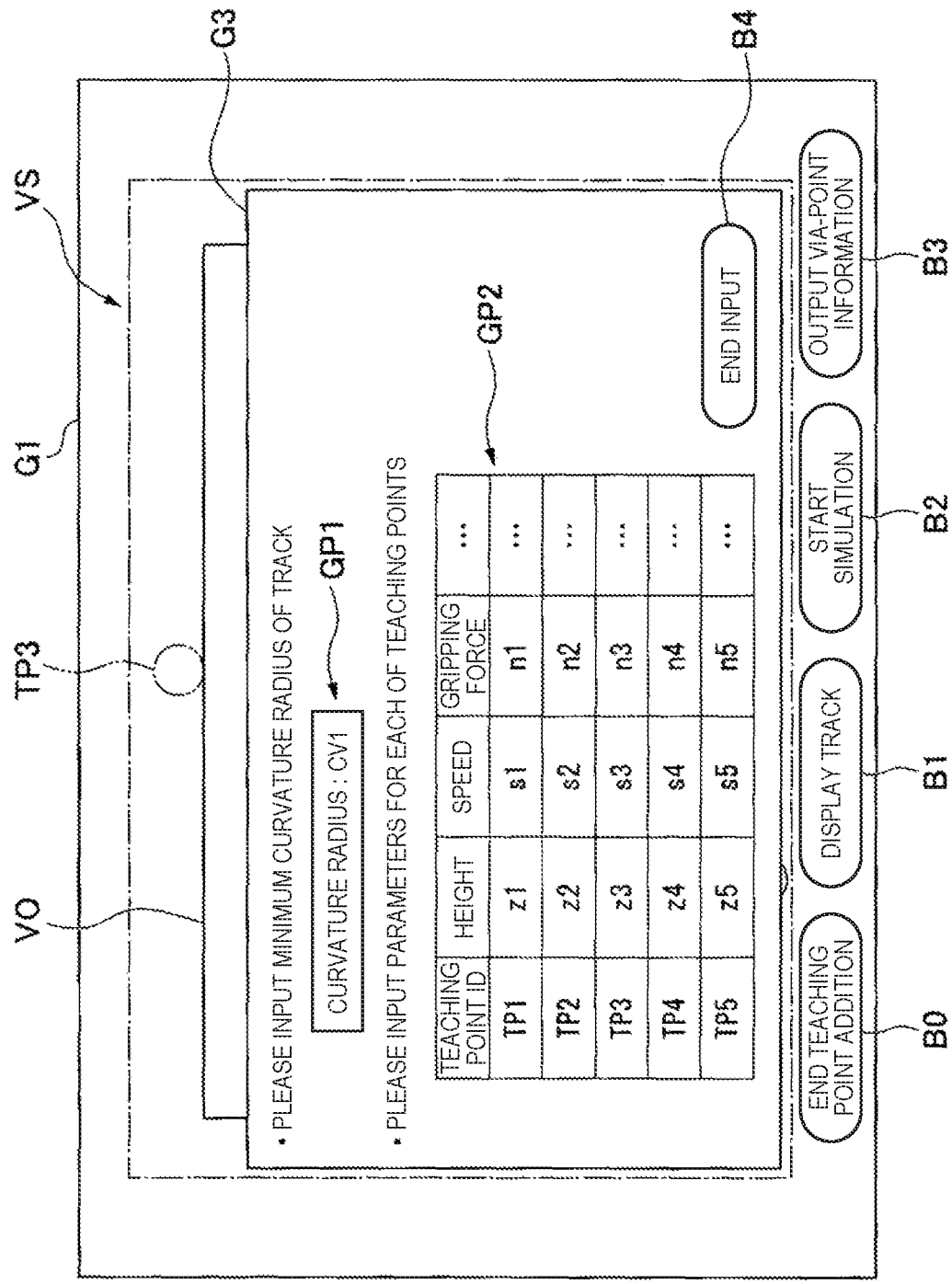
FIG. 8 is a diagram showing an example of the teaching screen in a state in which an additional information input screen is displayed.

The button B0 is a button for ending the addition of a teaching point (the addition of information representing the teaching point in the virtual space V). When the user taps the button B0, the display control section 361 determines that the addition of a teaching point by the user has ended. When determining that the addition has ended, the display control section 361 causes the display section 35 to display an additional information input screen G3 shown in FIG. 8 on the virtual space display region VS. FIG. 8 is a diagram showing an example of the teaching screen G1 in a state in which the additional information input screen G3 is displayed.

The additional information input screen G3 includes a minimum curvature information input field GP1, an additional information input field GP2, and a button B4.

The minimum curvature information input field GP1 is a field to which minimum curvature information is input. In this example, the minimum curvature information means information for designating a minimum curvature of a curve included in a provisional track generated by the track generating section 363 on the basis of the teaching points generated by the display control section 361. In this example, a curvature is represented by a curvature radius. Therefore, the user can input, as the minimum curvature information, a minimum curvature radius of the curve from the minimum curvature information input field GP1. The minimum curvature information is an example of second information.

The additional information input field GP2 is a field to which additional information is input. In this example, the additional information includes three kinds of information, that is, teaching point height information, teaching point speed information, and teaching point gripping force information associated with the teaching points specified by the display control section 361. The teaching point height information is information indicating positions in the Z-axis direction of the robot coordinate system RC in the teaching point position information associated with the teaching points. Note that the additional information may include other information in addition to these kinds of information. In the additional information input field GP2, teaching point IDs for identifying the teaching points generated by the display control section 361 are displayed in advance. The user can input the teaching point height information, the teaching point speed information, and the teaching point gripping force information from the additional information input field GP2. The teaching point speed information and the teaching point gripping force information are respectively examples of third information.

The button B4 is a button for ending the input of the information by the user respectively from the minimum curvature information input field GP1 and the additional information input field GP2. When the user taps the button B4, the display control section 361 causes the storing section 32 to store the minimum curvature information input to the minimum curvature information input field GP1 by the user. The display control section 361 associates the teaching point height information, the teaching point speed information, and the teaching point gripping force information input to the additional information input field GP2 with the teaching points indicated by the teaching point IDs respectively associated with these kinds of information. The display control section 361 deletes the additional information input screen G3.

Referring back to FIGS. 6 and 7, the button B1 is a button for generating a via-point track on the basis of the teaching points generated by the display control section 361 and displaying the generated via-point track in the virtual space display region VS. When the button B1 is tapped by the user, the track generating section 363 generates a provisional track on the basis of the teaching points generated by the display control section 361 and the minimum curvature information stored in the storing section 32. Specifically, the track generating section 363 generates (calculates), on the basis of the teaching points generated by the display control section 361, as a provisional track, a Bézier curve including a curve having a curvature radius equal to or larger than the minimum curvature radius indicated by the minimum curvature information, the Bézier curve passing the teaching points in the order of the sequential numbers of the teaching points.

Figure 9:
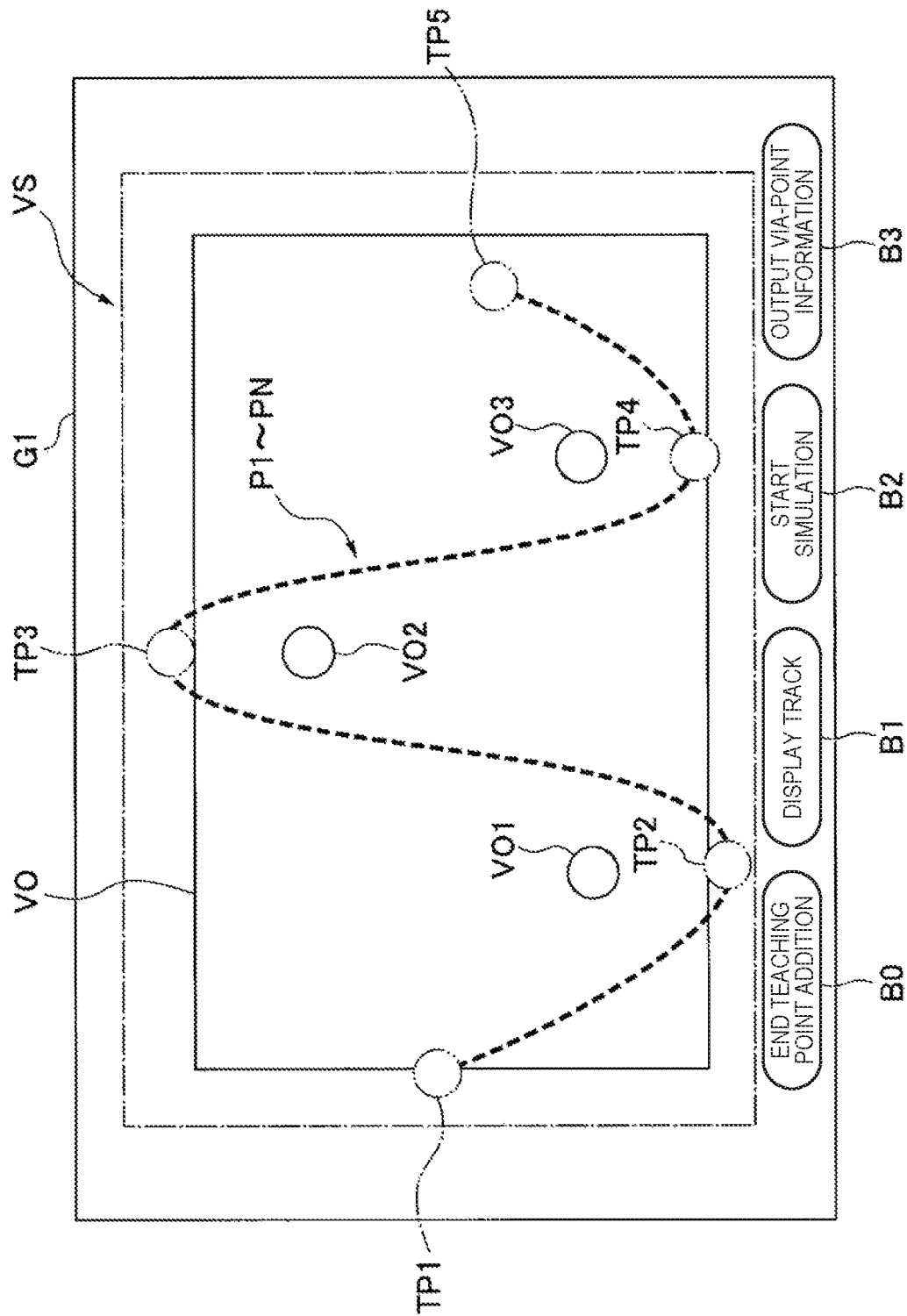
FIG. 9 is an image diagram in which via-points generated by a track generating section on the basis of a provisional track are superimposed on the teaching screen on the basis of the positions of the via-points.

After the track generating section 363 generates the provisional track, the via-point generating section 364 generates, on the basis of a predetermined condition, the predetermined number N of via-points such that the via-points are located apart from one another at equal intervals on the provisional track. FIG. 9 is an image diagram in which via-points generated by the track generating section 363 on the basis of the provisional track are superimposed on the teaching screen G1 on the basis of the positions of the via-points. Points P1 to PN included in a dotted line shown in FIG. 9, which is a dotted line passing the teaching points represented by the respective circles TP1 to TP5, are information representing the respective predetermined number N of teaching points. Note that, for simplification of the figure, the points P1 to PN shown in FIG. 9 are drawn in a number smaller than one hundred, which is the predetermined number N in this example.

After generating the provisional track, the via-point generating section 364 calculates, on the basis of the postures of the teaching points, postures of the via-points, which are not coinciding points, among the generated via-points. The via-point generating section 364 associates the postures calculated concerning the respective via-points with the respective via-points. The via-point generating section 364 calculates speeds of the via-points on the basis of the speeds of the coinciding points. The via-point generating section 364 associates, with the respective via-points, the speeds calculated with respect to the respective via-points. The via-point generating section 364 calculates gripping forces of the via-points on the basis of the gripping forces of the coinciding points. The via-point generating section 364 associates the gripping force calculated concerning the respective via-points with the respective via-points. The via-point generating section 364 calculates sequential numbers of the generated via-points on the basis of the sequential numbers of the coinciding points. The via-point generating section 364 associates the sequential numbers calculated concerning the respective via-points with the respective via-points. The via-point generating section 364 generates the via-points respectively associated with the via-point position information, the via-point posture information, the via-point sequential number information, the via-point speed information, and the via-point gripping force information in this way. The via-point information output section 368 generates via-point information on the basis of the generated via-points.

Figure 10:
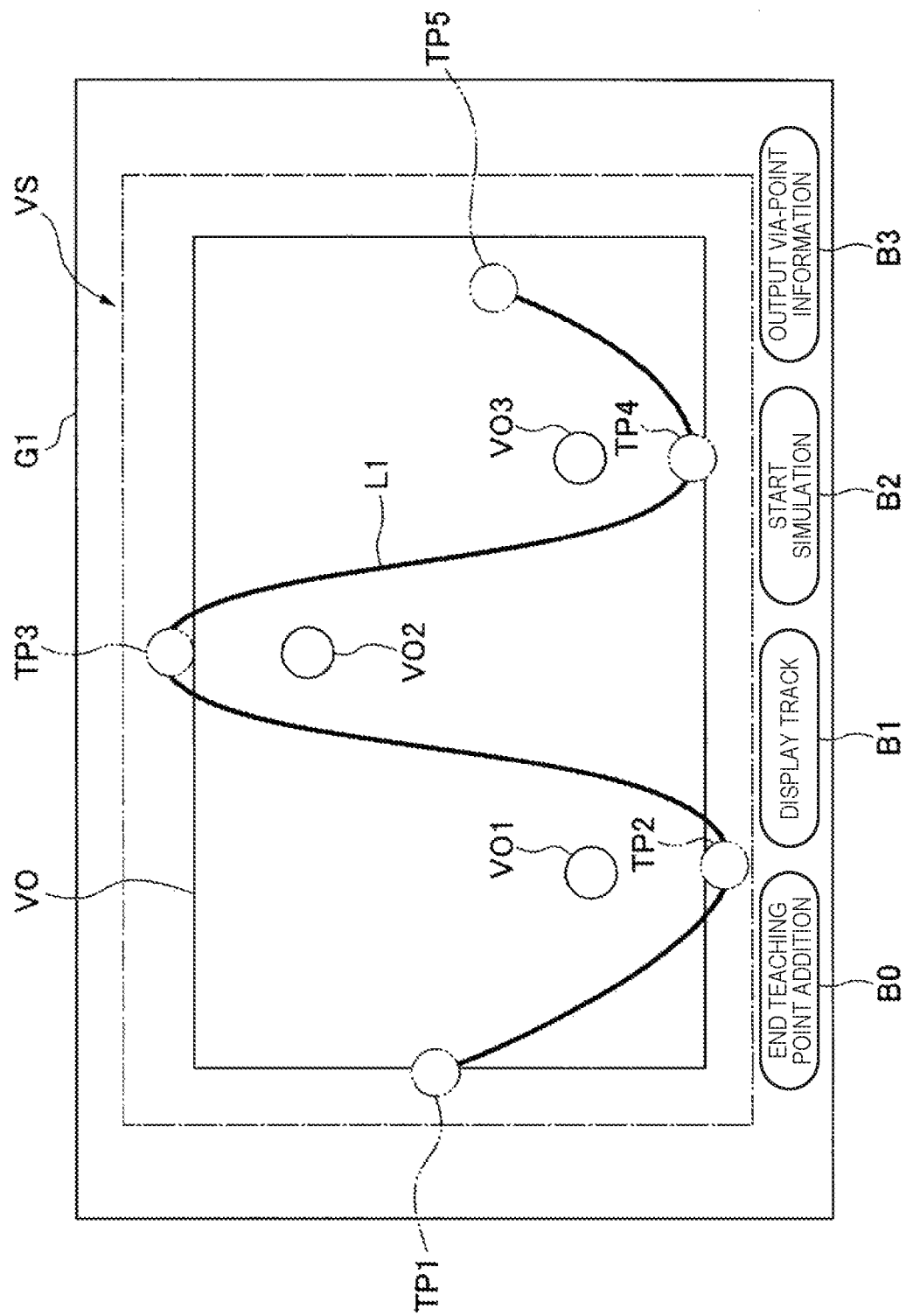
FIG. 10 is a diagram showing an example of the teaching screen in a state in which a via-point track is displayed in a virtual space display region.

After the via-point generating section 364 generates the via-point information, the display control section 361 connects, on the basis of the via-point information, the via-points indicated by the via-point information in the order of the sequential numbers of the via-points with a line to thereby calculate a via-point track. The display control section 361 causes, on the basis of the positions of the via-points, the display section 35 to display the calculated via-point track in the virtual space display region VS. FIG. 10 is a diagram showing an example of the teaching screen G1 in a state in which the via-point track is displayed in the virtual space display region VS. As shown in FIG. 10, the display control section 361 causes the display section 35 to display a via-point track L1 in the virtual space display region VS. Consequently, when operating the robot 20 on the basis of the teaching points input by the user, the information processing device 30 can visually provide the user with a track on which the robot 20 draws around the cable C.

Figure 11:
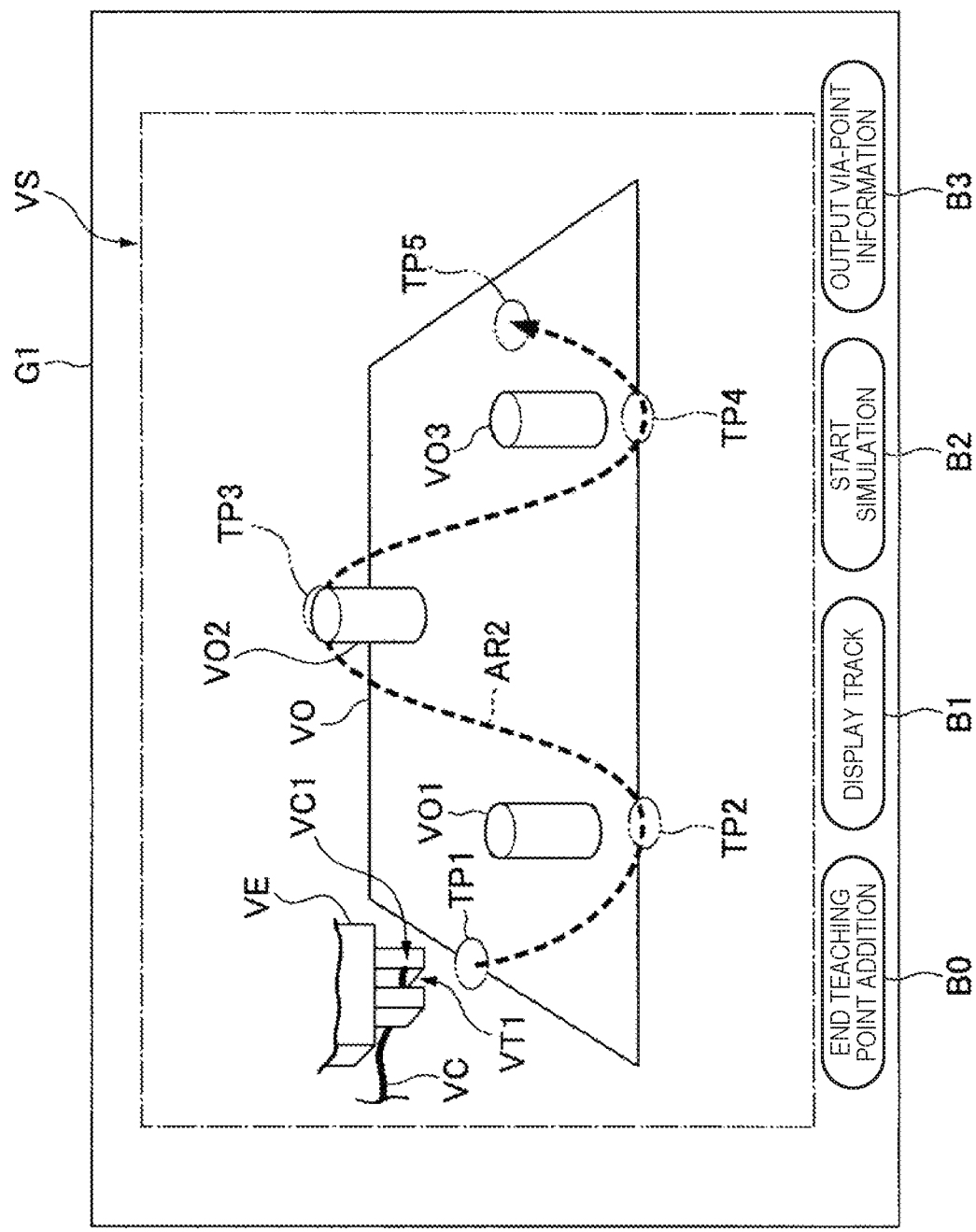
FIG. 11 is a diagram showing an example of the teaching screen in a state in which a result of a simulation executed by a simulation section is displayed in the virtual space display region.

The button B2 is a button for executing a simulation based on the via-points generated by the via-point generating section 364. When the button B2 is tapped by the user, the simulation section 365 executes the simulation. The simulation section 365 causes, with the display control section 361, the display section 35 to display a moving image of a result of the executed simulation (a simulation result) in the virtual space display region VS. FIG. 11 is a diagram showing an example of the teaching screen G1 in a state in which the result of the simulation executed by the simulation section 365 is displayed in the virtual space display region VS.

In the simulation executed by the simulation section 365, an end effector VE, which is gripping an end portion VC1, draws around a cable VC along a route AR2 indicated by an arrow shown in FIG. 11. The cable VC is a virtual cable C in the virtual space V. The end portion VC1 is virtual end portion C1 in the virtual space V. The end effector VE is a virtual end effector E in the virtual space V. The route AR2 is a route along the via-point track generated by the via-point generating section 364.

The display control section 361 causes, according to a request from the simulation section 365, the display section 35 to display, in the virtual space display region VS, a moving image of a state in which a control point VT1 moves along the route AR2 in the virtual space V displayed in the virtual space display region VS as a result of the simulation executed by the simulation section 365, whereby the end effector E draws around the cable VC. Consequently, when operating the robot 20 on the basis of the teaching points input by the user, the information processing device 30 can visually provide, without actually moving the robot 20, the user with a state in which the robot 20 draws around the cable C. Note that, in FIG. 11, for simplification of the figure, only the end effector VE of the virtual robot 20 in a virtual space displayed in the virtual space display region VS is drawn. The other parts of the virtual robot 20 other than the end effector VE are not shown.

Figure 12:
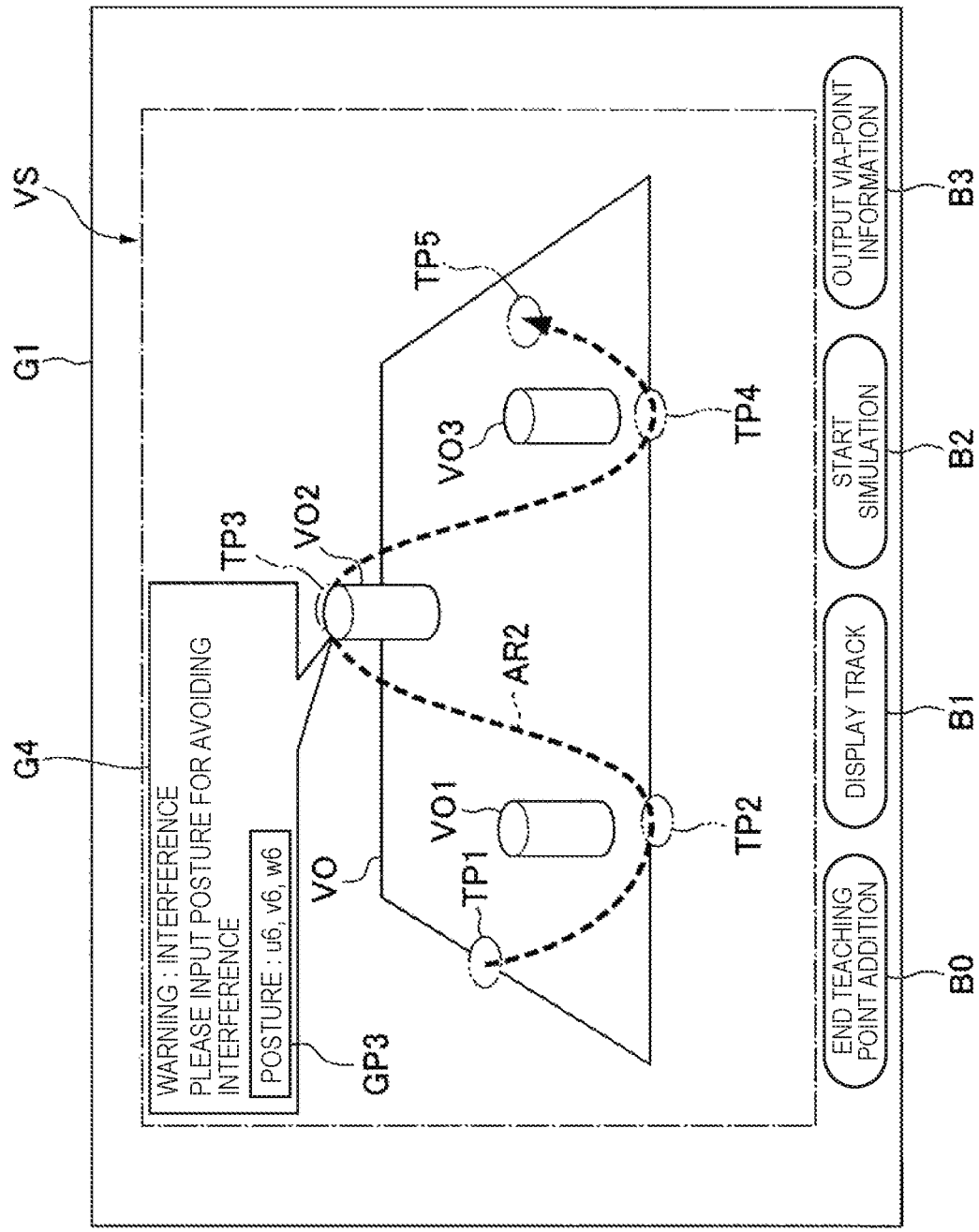
FIG. 12 is a diagram showing an example of the teaching screen in a state in which information indicating a position where interference of an arm and another object occurs is displayed.

The simulation section 365 determines, in the executed simulation, whether the arm VA, which is a virtual arm A including the end effector VE, interferes with (touches) another object such as the protrusion sections VO1 to VO3. In the simulation, when interference of the arm VA and another object occurs, as shown in FIG. 12, the simulation section 365 causes, with the display control section 361, the display section 35 to display, in the virtual space display region VS, information indicating a position where the interference occurs. FIG. 12 is a diagram showing an example of the teaching screen G1 in a state in which the information indicating the position where the interference of the arm VA and the other object occurs is displayed.

In FIG. 12, an example is shown in which interference of the arm VA and the protrusion section VO2 occurs. When such interference occurs, the via-point generating section 364 detects, at timing when the interference occurs, an interference position, which is the position of the control point VT1 of the arm VA and is a position on the via-point track L1 shown in FIG. 10. When the detected interference position coincides with the position of the via-point generated by the via-point generating section 364, the via-point generating section 364 specifies the via-point, the position of which coincides with the interference position, as an interference via-point.

When the detected interference position does not coincide with the position of the via-point generated by the via-point generating section 364, the via-point generating section 364 generates a new via-point as the interference via-point in the interference position. The via-point generating section 364 associates via-point position information indicating the interference position with the generated interference via-point. The via-point generating section 364 calculates a sequential number of the generated interference via-point on the basis of the sequential numbers of respective two via-points adjacent to the interference via-point on the via-point track L1. For example, when the sequential numbers of the respective two via-points are fifteenth and sixteenth, the interference-point generating section 364 calculates, as the sequential number of the interference via-point, 15.5-th, which is a sequential number obtained by adding up the sequential numbers and dividing a total by 2. The via-point generating section 364 associates via-point sequential number information indicating the calculated sequential number with the generated interference via-point. The via-point generating section 364 calculates speed of the generated interference via-point on the basis of the speeds of the respective two via-points. A method of calculating speed of the interference via-point is the same as the method of calculating speed of the via-point included between the two coinciding points. Therefore, explanation of the method is omitted. The via-point generating section 364 associates via-point speed information indicating the calculated speed of the interference via-point with the generated interference via-point. The via-point generating section 364 calculates a gripping force of the generated interference via-point on the basis of the gripping forces of the respective two via-points. A method of calculating a gripping force of the interference via-point is the same as the method of calculating a gripping force of the via-point included between the two coinciding points. Therefore, explanation of the method is omitted. The via-point generating section 364 associates, with the generated interference via-point, via-point gripping force information indicating the calculated gripping force of the interference via-point.

The display control section 361 causes the display section 35 to display an interference warning screen G4 in the virtual space display region VS as information indicating the position of the specified or generated interference via-point (i.e., the interference position). The interference warning screen G4 is a screen for displaying a message for warning that the interference of the arm VA and the protrusion section VO2 has occurred and is a screen for causing the user to input via-point posture information associated with the interference via-point. The interference warning screen G4 includes a projecting section. The projecting section extends from a portion where the message is displayed on the interference warning screen G4 to the position of the interference via-point and indicates the position of the interference via-point. Note that the display control section 361 may cause the display 35 to display the interference warning screen G4 not including the protrusion section in the virtual space display region VS. In this case, the display control section 361 displays, together with the interference warning screen G4, information representing the position of the interference via-point. For example, the display control section 361 may change a color of the position of the interference via-point to a color different from a color around the interference via-point or may cause the display section 35 to display a mark such as a star mark in the position of the interference via-point.

The interference warning screen G4 includes an interference avoidance posture input field GP3 in addition to the message for warning that interference of the arm VA and the protrusion VO2 has occurred.

The interference avoidance posture input field GP3 is a field for causing the user to input via-point posture information associated with the interference via-point. When the via-point posture information is input to the interference avoidance posture input field GP3 by the user, the via-point generating section 364 associates the input via-point posture information with the interference via-point. When the interference via-point is an interference via-point specified by the via-point generating section 364, the via-point generating section 364 re-associates the via-point posture information, which is associated with the interference via-point, with the via-point posture information input from the interference avoidance posture input field GP3 by the user. Consequently, the user can change the posture of the control point VT1 at the interference via-point to a posture in which interference of the arm VA and the protrusion section VO2 does not occur. After the via-point generating section 364 associates via-point posture information indicating the posture with the interference via-point, the display control section 361 deletes the interference warning screen G4.

Referring back to FIGS. 6 and 7, the button B3 is a button for outputting the via-point information generated by the via-point generating section 364 to the control device 40. When the button B3 is tapped by the user, the via-point-information output section 368 causes the communication section 34 to output the present via-point information to the control device 40.

As explained above, teaching points small in number compared with the number of via-points are taught (input) by the user, whereby the information processing device 30 can generate via-points and output the via-point information based on the generated via-points to the control device 40. As a result, the information processing device 30 can reduce time of work in which the user teaches the control device 40 about the via-points and can suppress an increase in temporal cost and personnel cost concerning the work.

Figure 13:
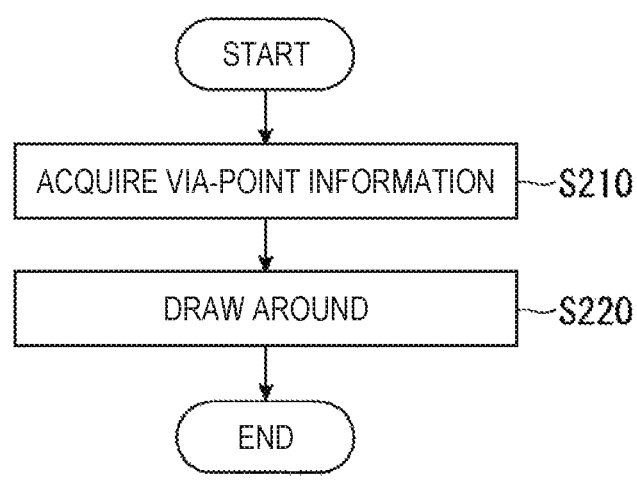
FIG. 13 is a flowchart showing an example of a flow of processing in which the control device causes a robot to perform predetermined work.

Processing in which the Control Device Causes the Robot to Perform the Predetermined Work Processing in which the control device 40 causes the robot 20 to perform the predetermined work is explained with reference to FIG. 13. FIG. 13 is a flowchart for explaining an example of a flow of the processing in which the control device 40 causes the robot 20 to perform the predetermined work. In the flowchart shown in FIG. 13, processing after the via-point information is output from the information processing device 30 to the control device 40 is explained.

The via-point-information acquiring section 464 acquires the via-point information from the information processing device 30 (step S210). The via-point-information acquiring section 464 causes the storing section 42 to store the acquired via-point information.

Subsequently, the robot control section 466 reads out, from the storing section 42, the via-point information that the via-point-information acquiring section 464 causes the storing section 42 to store in step S210. The robot control section 466 causes, on the basis of the read-out via-point information, the robot 20 to perform the predetermined work (step S220) and ends the processing.

Specifically, the robot control section 466 matches the control point T1 with the via-points indicated by the via-point information in the order of the sequential numbers of the via-points. The robot control section 466 moves the control point T1 on the basis of the speeds of the via-points. The robot control section 466 causes, on the basis of the gripping forces of the via-points, the end effector E to grip the cable C. The robot control section 466 operates the robot according to control based on the force detection information acquired by the force-detection-information acquiring section 463. For example, when a force exceeding a predetermined threshold is applied to the end effector E, that is, when tension exceeding a predetermined threshold is applied to the cable C, the robot control section 466 reduces speed for moving the control point T1 by a predetermined ratio such that the tension applied to the cable C decreases to be smaller than the predetermined threshold. Consequently, the robot control section 466 changes the tension applied to the cable C. The predetermined threshold is, for example, a force with which at least a part of the cable C factures. Note that the predetermined threshold may be another threshold instead of the force. The predetermined ratio is, for example, 20%. Note that the predetermined ratio may be another ratio instead of 20%. Note that, in this case, the robot control section 466 may stop the operation of the robot 20 and cause, with the display control section 361, the display section 45 to display information indicating that the tension exceeding the predetermined threshold is applied to the cable C. The robot control section 466 may change the generated track such that the tension applied to the cable C decreases to be smaller than the predetermined threshold.

In this way, the control device 40 causes, on the basis of the via-point information acquired from the information processing device 30, the robot 20 to perform work for drawing around a linear object. Consequently, the control device 40 can easily perform the work for drawing around the linear object. Since the control device 40 causes the robot 20 to draw around the linear object, the control device 40 can keep fixed quality without causing a state of the drawn-around linear object to fluctuate. As a result, the control device 40 can suppress possibility of occurrence of a deficiency due to the fluctuation of the state.

Note that, in the above explanation, all of the first object O, the virtual robot 20, and the like included in the virtual space V are models. The models are, for example, CG (Computer Graphics). The CG may be, for example, three-dimensional CG or may be two-dimensional CG. The three-dimensional CG is represented as, for example, a set of polygon data.

In the example explained above, the robot 20 grips the cable C with the finger sections of the end effector E. However, the cable C may be gripped by a tool gripped by the end effector E and capable of gripping the cable C or may be gripped by the tool provided in the end effector E. In these cases, the position of the control point T1 is set in, of end portions of the tool, a position associated with an end portion on the opposite side of the end effector E side. The position is, for example, the position of the end portion of the tool.

Figure 14:
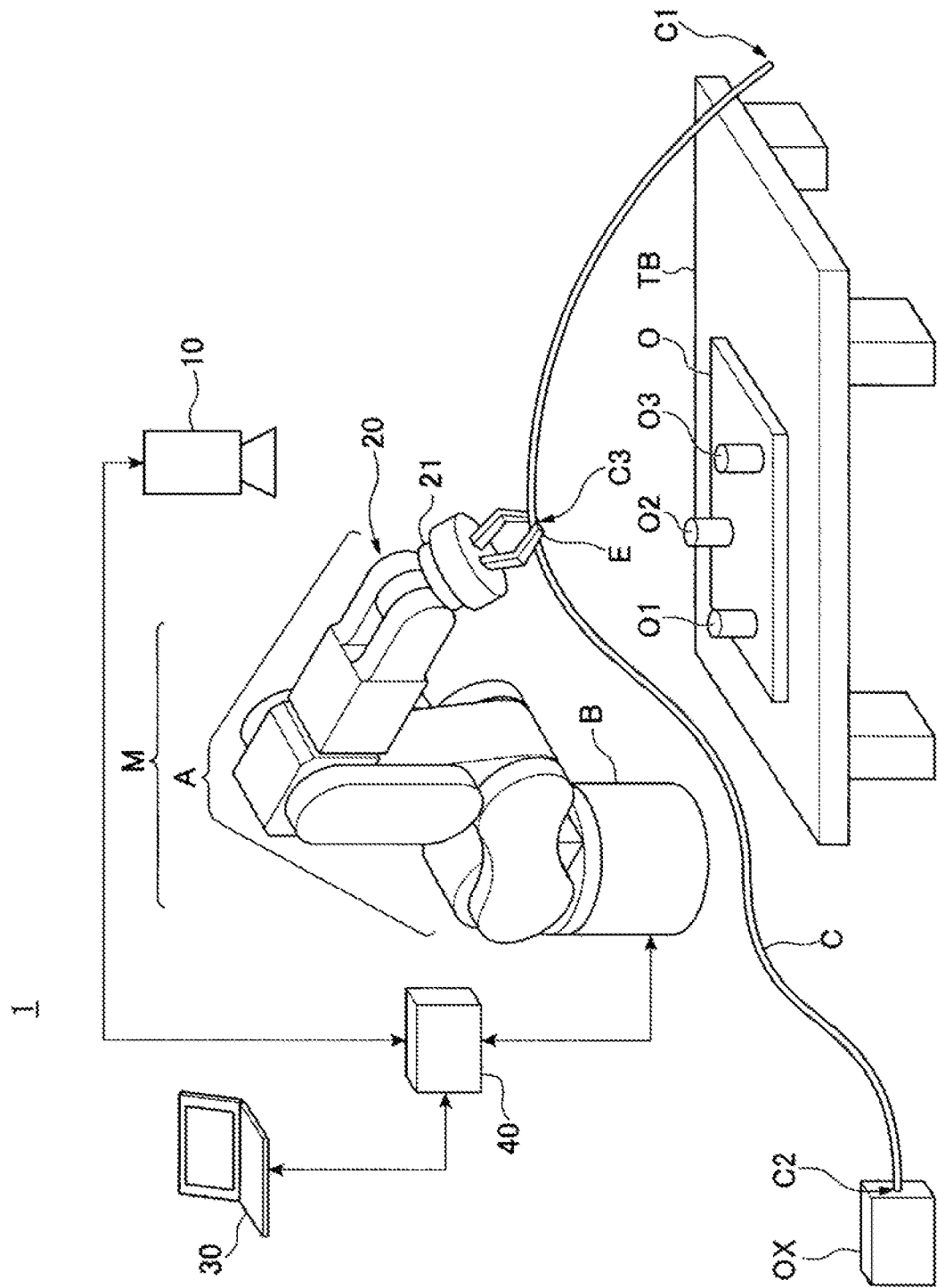
FIG. 14 is a diagram showing an example of the configuration of the robot system in the case in which the robot is gripping a part different from an end portion of a cable.

Example in which the Robot is Gripping a Part Different from the End Portion of the Cable An example of processing performed in the robot system 1 when the robot 20 is gripping a part different from the end portion C1 of the cable C is explained with reference to FIG. 14. FIG. 14 is a diagram showing an example of the configuration of the robot system 1 in the case in which the robot 20 is gripping the part different from the end portion C1 of the cable C.

In FIG. 14, an end portion C2, which is an end portion on the opposite side of the end portion C1 of the end portions of the cable C, is connected to an object OX. The object OX is, for example, a device that performs communication and power feeding via the cable C. In the example shown in FIG. 14, the object OX is represented as an object having a rectangular parallelepiped shape. In this example, the object OX is set (fixed) on a floor surface not to move from the floor surface. Even when the robot 20 pulls the cable C with the end effector E, the object OX does not move. Note that the shape of the object OX may be another shape.

In this example, the robot 20 is gripping, with the end effector E, a part C3 between the end portion C1 and the end portion C2 among parts of the cable C. In other words, the robot 20 is gripping, with the end effector E, the part C3 apart from the end portion C1 or the end portion C2 by predetermined length among the parts of the cable C. The predetermined length is, for example, one meter. Note that the predetermined length may be another length.

In a situation shown in FIG. 14, for example, when the robot 20 draws around the cable C with the end effector E, since the end portion C2 is connected to the object OX, tension equal to or larger than a predetermined force is sometimes applied between the end portion C2 and the part C3. The predetermined force is a force with which at least a part of a part to which the force is applied among the parts of the cable C fractures. Note that the predetermined force may be another force instead of the force.

When the robot 20 draws around the cable C with the end effector E, in some case, the cable C is caught by at least one of the protrusion sections O1 to O3 and does not move from a place where the cable C is caught. In such a case as well, tension equal to or larger than the predetermined force is sometimes applied to a part of the cable C.

In order to suppress the tension equal to or larger than the predetermined force from being applied to a part of the cable C in this way, the robot 20 in this example changes, in at least a part of a track on which the cable C is drawn around by the end effector E, a gripping force of gripping the cable C with the end effector E to a predetermined hauling-in gripping force. In this example, the predetermined hauling-in gripping force is a force of a degree with which the cable C does not slip off the finger sections because of the own weight of the cable C when the cable C is gripped by the finger sections of the end effector E. That is, when the end effector E, which is gripping the cable C with the predetermined hauling-in gripping force, is drawing around the cable C, if tension larger than the own weight of the cable C is applied between the end portion C2 and the part C3, the cable C slips with respect to the finger sections of the end effector E. Relative positions of the finger sections and the part C3 change. In the following explanation, a motion for drawing around the cable C while slipping the cable C in the finger sections is referred to as hauling-in motion and explained.

That is, the robot 20 in this example is gripping the part C3 in an initial state. Motions in the work for drawing around the cable C include a hauling-in motion. The robot 20 draws the cable C around the first object O while slipping the cable C with respect to the finger sections of the end effector E. Consequently, the robot 20 can perform, without causing the cable C to facture, the work for drawing around the cable C.

Note that the user can specify, according to an experiment performed by the user in advance, the shapes of the first object O and the cable C, and the like, a position to which the tension equal to or larger than the predetermined force is applied between the end portion C2 and the part C3. Therefore, in this example, the user can associate via-point gripping force information indicating the predetermined hauling-in force with desired via-points from the teaching screen displayed by the information processing device 30. In this example, processing in which the information processing device 30 changes gripping forces of via-points to the predetermined hauling-in gripping force on the basis of operation performed by the user on the teaching screen is explained in detail.

Figure 15:
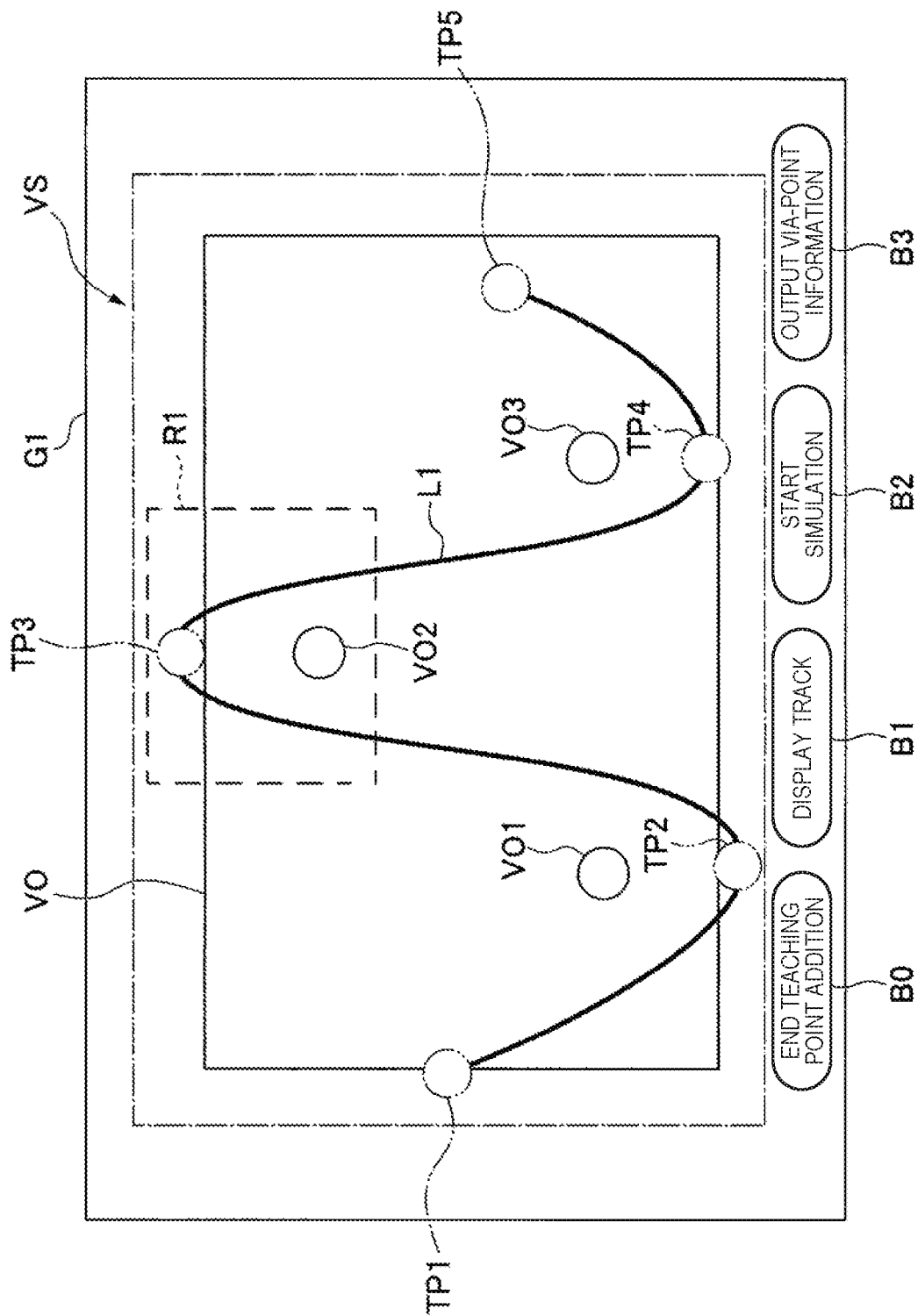
FIG. 15 is a diagram showing an example of a state in which a user is changing gripping forces of the via-points to a hauling-in gripping force when the via-point track is displayed in the virtual space display region of the teaching screen.

Processing 2 Performed by the Information Processing Device on the Basis of Operation Performed by the User on the Teaching Screen Processing in which the information processing device 30 changes gripping forces of via-points to the predetermined hauling-in gripping force on the basis of operation performed by the user on the teaching screen G1 is explained below with reference to FIG. 15. FIG. 15 is a diagram showing a state in which the user is changing gripping forces of the via-points to a hauling-in gripping force when the via-point track is displayed in the virtual space display region VS of the teaching screen G1.

As shown in FIG. 15, for example, the user can cause the display section 35 to display a selection range R1 in the virtual space display region VS by performing pinch-out on the virtual space display region VS. When the pinch-out is performed by the user on the virtual space display region VS, the display control section 361 causes the display section 35 to display, in the virtual space display region VS, the rectangular selection range R1 having an interval between two fingers in the pinch-out as a distance of diagonal lines.

When at least a part of the via-point track L1 is included on the inner side of the selection range R1, the via-point generating section 364 specifies (selects) via-points included in the part as via-points associated with the via-point gripping force information indicating the predetermined hauling-in gripping force. In order to change gripping forces of the respective specified via-points to the predetermined hauling-in gripping force, the via-point generating section 364 re-associates the via-point gripping force information, which is associated with the via-points, with the via-point gripping force information indicating the predetermined hauling-in gripping force. Consequently, the information processing device 30 can designate, out of the via-points with which the control point T1 is matched, via-points included in a range in which the information processing device 30 causes the end effector E to perform a hauling-in motion. The information processing device 30 can cause the robot 20 to easily perform predetermined work including the hauling-in motion.

Note that, when at least a part of the via-point track L1 is included on the inner side of the selection range R1, the via-point generating section 364 may associate second via-point gripping force information with the via-points included in the part in addition to first via-point gripping force information, which is via-point gripping force information associated with the via-points in advance. In this case, two kinds of via-point gripping force information are associated with the via-points included in the part. When any one of the via-points included in the part and the control point T1 coincide with each other, when determining on the basis of the force detection information acquired by the force-detection-information acquiring section 463 that a force equal to or larger than a predetermined force is applied to the end effector E, the control device 40 changes a gripping force for gripping the cable C with the end effector E to the predetermined hauling-in gripping force indicated by the second via-point gripping force information. Consequently, for example, by including the entire via-point track L1 on the inner side of the selection range R1, the control device 40 can easily cause the robot 20 to perform the predetermined work including the hauling-in motion even when a position where tension equal to or larger than the predetermined force is applied between the end portion C2 and the part C3 is not specified in advance.

Processing Performed by the Control Device when the Robot Performs Predetermined Work Including a Re-Gripping Motion When tension equal to or larger than the predetermined force is applied to the cable C, the robot 20 may perform a re-gripping motion instead of changing the gripping force with which the end effector E grips the cable C to the predetermined hauling-in gripping force. The re-gripping motion is a motion of the end effector E re-gripping a part different from a part of the cable C currently gripped by the end effector E among the parts of the cable C. Processing in which the control device 40 causes the robot 20 to perform the predetermined work including the re-gripping motion is explained below with referenced to FIG. 16.

Figure 16:
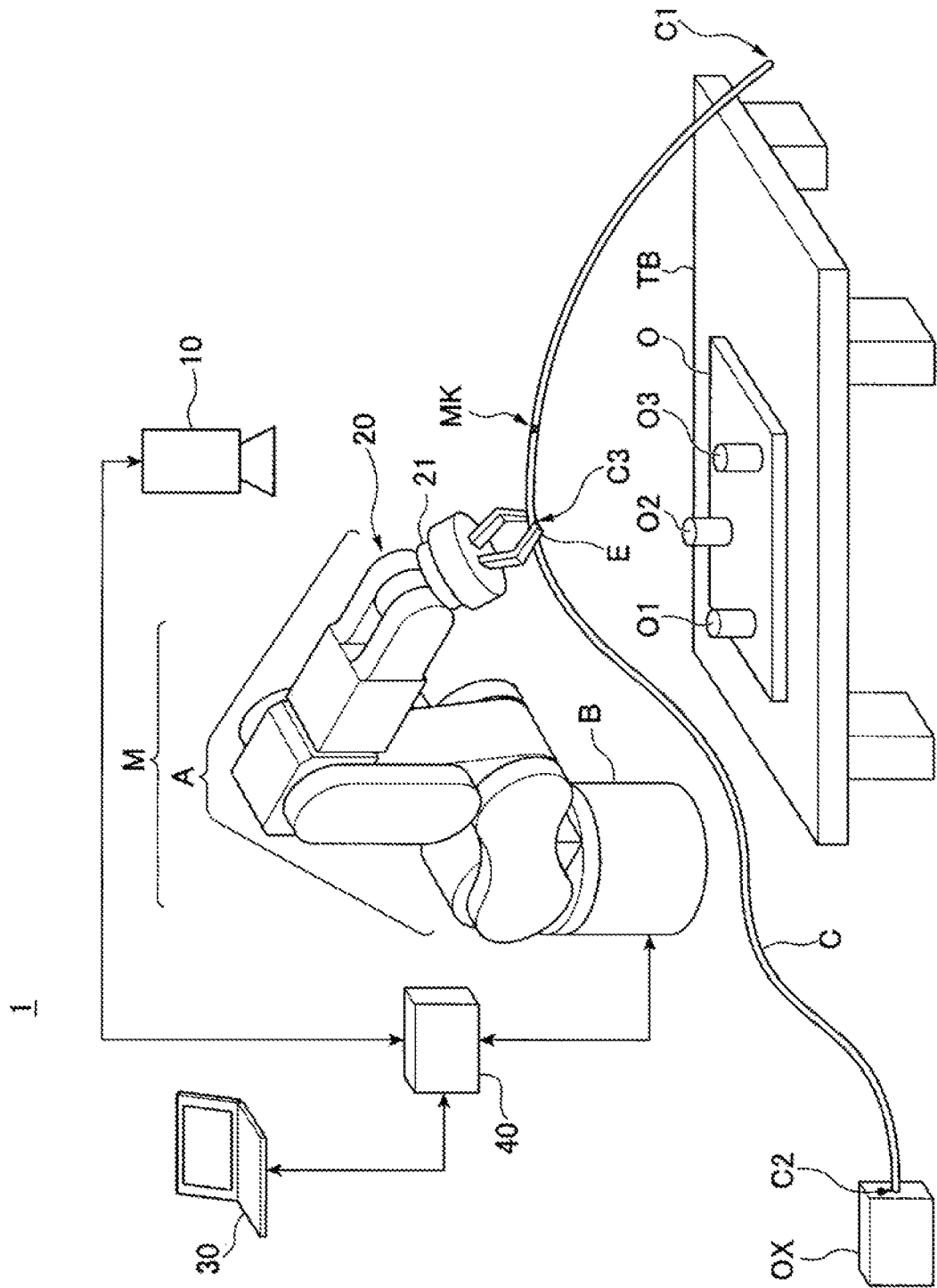
FIG. 16 is a diagram showing an example of the configuration of the robot system at the time when the robot system causes the robot to perform predetermined work including a re-gripping motion.

FIG. 16 is a diagram showing an example of the configuration of the robot system 1 at the time when the robot system 1 causes the robot 20 to perform the predetermined work including the re-gripping motion. Components excluding the cable C among the components of the robot system 1 shown in FIG. 16 are the same as the components of the robot system 1 shown in FIG. 14. Therefore, explanation of the components is omitted. In the cable C shown in FIG. 16, a marker MK is provided between the end portion C1 and the part C3. The marker MK is a mark indicating a position that the robot 20 grips with the finger sections of the end effector E in the re-gripping motion. Note that the mark may be a part of the cable C.

The robot control section 466 causes, on the basis of via-point information acquired by the via-point-information acquiring section 464 from the information processing device 30, the robot 20 to perform a predetermined motion. At this point, the robot control section 466 causes, according to control based on force detection information acquired by the force-detection-information acquiring section 463, the robot 20 to perform the predetermined motion.

Specifically, the robot control section 466 determines on the basis of the force detection information whether tension equal to or larger than the predetermined force is applied between the end portion C2 and the part C3 of the cable C. When determining on the basis of the force detection information that the force equal to or larger than the predetermined force is applied to the end effector E, the robot control section 466 determines that the tension is applied between the end portion C2 and the part C3. On the other hand, when determining on the basis of the force detection information that force smaller than the predetermined force is applied to the end effector E, the robot control section 466 determines that the tension is not applied between the end portion C2 and the part C3.

When determining that the tension equal to or larger than the predetermined force is applied between the end portion C2 and the part C3 of the cable C, the robot control section 466 stops the movement of the control point T1. In this case, the robot control section 466 specifies (detects) a via-point corresponding to timing when the robot control section 466 determines that the tension is applied between the end portion C2 and the part C3. The via-point corresponding to the timing is, for example, a via-point with which the control point T1 coincides immediately before the timing. Note that the via-point corresponding to the timing may be, instead of the via-point, another via-point corresponding to the timing such as a via-point with which the control point T1 coincides at the timing. The robot control section 466 stores the specified via-point corresponding to the timing. In this case, the image-pickup control section 461 causes the image pickup section 10 to pick up an image of a range in which the image pickup section 10 is capable of performing image pickup. The image acquiring section 462 acquires the picked-up image picked up by the image pickup section 10.

The position detecting section 465 detects, on the basis of the picked-up image acquired by the image acquiring section 462, a position indicated by the marker MK included in the picked-up image. The robot control section 466 opens the finger sections of the end effector E to cause the end effector E to release the cable C. Thereafter, the robot control section 466 moves the end effector E on the basis of the position indicated by the marker MK detected by the position detecting section 465 and causes the finger sections of the end effector E to grip the position.

Thereafter, the robot control section 466 causes the robot 20 to continue the predetermined work by matching, on the basis of the stored via-point, which is the via-point corresponding to the timing when the robot control section 466 determines that the tension equal to or larger than the predetermined force is applied between the end portion C2 and the part C3 of the cable C, in order from a via-point of a sequential number next to the sequential number of the via-point, the control point T1 with the remaining via-points with which the control point T1 does not coincide yet.

In this way, the control device 40 causes the robot 20 to perform the predetermined work including the re-gripping motion. Consequently, the control device 40 can cause the robot 20 to complete the predetermined work by re-holding the cable C, that is, performing the re-gripping motion, for example, even when the cable Cis caught because of some reason and cannot be pulled or when a part of the arm A interferes with another object or the arm A itself when the posture of the control point T1 is changed.

Note that the position detecting section 465 may be configured to detect, on the basis of the picked-up image acquired by the image acquiring section 462, the position and the posture of the marker MK included in the picked-up image. In this case, the robot control section 466 moves the end effector E on the basis of the position and the posture detected by the position detecting section 465 and causes the finger sections of the end effector E to grip the position.

The robot control section 466 may start the re-gripping motion when a via-point designated in advance by the user and the control point T1 coincide with each other instead of stopping the movement of the control point T1 and starting the re-gripping motion when determining that the tension equal to or larger than the predetermined force is applied between the end portion C2 and the part C3 of the cable C. In this case, the information processing device 30 causes the user to select a desired via-point where the user desires to cause the robot control section 466 to start the re-gripping motion on the teaching screen G1. The information processing device 30 associates information indicating that the re-gripping motion is started with the via-point selected by the user. The information is an example of fourth information. The control device 40 acquires, from the information processing device 30, via-point information including the via-point associated with the information and causes, on the basis of the acquired via-point information, the robot 20 to perform the predetermined work including the re-gripping motion. The control device 40 matches the control point T1 with the via-points according to the sequential numbers of the via-points on the basis of the via-point information. When the via-point associated with the information and the control point T1 coincide with each other, the control device 40 stops the movement of the control point T1. Thereafter, as explained above, the robot control section 466 performs the re-gripping motion on the basis of the position indicated by the marker MK detected by the position detecting section 465 on the basis of the picked-up image that the image-pickup control section 461 causes the image pickup section 10 to pick up.

As explained above, the control device 40 in this embodiment controls the robot 20 on the basis of the first information (in this example, the via-point position information and the via-point sequential number information) concerning the positions and the sequential numbers for drawing the linear object (in this example, the cable C) around the first object (in this example, the first object O). Consequently, the control device 40 can easily perform the work for drawing around the linear object.

The control device 40 controls the robot 20 on the basis of the first information received on the basis of the picked-up image displayed on the display section (in this example, the display section 35). Consequently, the control device 40 can easily perform, on the basis of the first information received on the basis of the image displayed on the display section, the work for drawing around the linear object.

The control device 40 controls the robot 20 on the basis of the first information received on the basis of the model displayed on the display section. Consequently, the control device 40 can easily perform, on the basis of the first information received on the basis of the model displayed on the display section, the work for drawing around the linear object.

The control device 40 controls the robot 20 on the basis of the track (in this example, the provisional track or the via-point track L1) of the robot 20 generated on the basis of the first information. Consequently, the control device 40 can easily perform, on the basis of the track of the robot 20 generated on the basis of the first information, the work for drawing around the linear object.

The control device 40 controls the robot 20 on the basis of the first information and the second information (in this example, the minimum curvature information). Consequently, the control device 40 can easily perform, on the basis of the first information and the second information, the work for drawing around the linear object.

The control device 40 controls the robot 20 on the basis of the first information and the third information (in this example, the via-point gripping force information). Consequently, the control device 40 can easily perform, on the basis of the first information and the third information, the work for drawing around the linear object.

The control device 40 controls the robot 20 on the basis of the first information and the fourth information (in this example, the position indicated by the marker MK). Consequently, the control device 40 can easily perform, on the basis of the first information and the fourth information, the work for drawing around the linear object.

The control device 40 changes the tension of the linear object on the basis of the output (in this example, the force detection information) of the force detecting section (the force detecting section 21). Consequently, the control device 40 can easily perform, on the basis of the first information and the output of the force detecting section, the work for drawing around the linear object.

The control device 40 controls the robot 20 on the basis of the interference position of the robot (in this example, the virtual robot 20) and the first object displayed on the display section. Consequently, the control device 40 can easily perform, on the basis of the first information and the interference position of the robot 20 and the first object, the work for drawing around the linear object.

The embodiment of the invention is explained above in detail with reference to the drawings. However, a specific configuration is not limited to the embodiment and may be, for example, changed, substituted, or deleted without departing from the spirit of the invention.

It is also possible to record, in a computer-readable recording medium, a computer program for realizing functions of any components in the devices (e.g., the information processing device 30 and the control device 40) explained above, cause a computer system to read the computer program, and execute the computer program. Note that the "computer system" includes an operating system (OS) and hardware such as peripheral devices. The "computer-readable recording medium" refers to a portable medium such as a flexible disk, a magneto-optical disk, a ROM, or a CD (Compact Disk)-ROM or a storage device such as a hard disk incorporated in the computer system. Further, the "computer-readable recording medium" includes a recording medium that stores a computer program for a fixed time such as a volatile memory (a RAM) inside a computer system functioning as a server or a client when a computer program is transmitted via a network such as the Internet or a communication line such as a telephone line.

The computer program may be transmitted from a computer system, which stores the computer program in a storage device or the like, to another computer system via a transmission medium or by a transmission wave in the transmission medium. The "transmission medium", which transmits the computer program, refers to a medium having a function of transmitting information like a network (a communication network) such as the Internet or a communication line (a communication wire) such as a telephone line.

The computer program may be a computer program for realizing a part of the functions explained above. Further, the computer program may be a computer program that can realize the functions in a combination with a computer program already recorded in the computer system, a so-called differential file (a differential program).

The entire disclosure of Japanese Patent Application No. 2016-034275, filed Feb. 25, 2016 is expressly incorporated by reference herein.

What is claimed is:

1. A system configured to control a robot, the system comprising:
   an input device configured to receive teaching point information, wherein the teaching point information includes (i) a plurality of first positions of teaching points, (ii) a respective posture of the robot at each of the teaching points, (iii) a sequence of the teaching points, (iv) a respective speed of the robot at each of the teaching points, and (v) a respective gripping force of the robot at each of teaching points;
   a display configured to display the teaching point information;
   an information processing device configured to calculate a track around a first object based on the teaching point information and generate via points corresponding to the track; and
   a control device configured to control the robot based on the via points,
   wherein the display displays a picked-up image of the first object picked up by an image pickup section,
   the input device receives the teaching point information on the basis of the picked-up image displayed on the display,
   the track of the robot is generated by a track generating section on the basis of the teaching point information,
   the track includes a curve,
   the control device controls the robot on the basis of the track,
   the input device receives information concerning a minimum curvature of the curve, and
   the curve does not include a curve having a curvature smaller than the minimum curvature.

2. The system according to claim 1, wherein the input device receives information concerning a gripping force with which the robot grips the first object.

3. A robot controlled by the system according to claim 2.

4. The system according to claim 1, wherein the input device receives information concerning a re-gripping position when the robot re-grips the first object.

5. The system according to claim 1, wherein
   the robot includes a force detecting section, and
   the control device is configured to change tension of a linear object on the basis of an output of the force detecting section.

6. The system according to claim 1, wherein the display displays an interference position of the robot and the first object based on a simulation result obtained when the robot operates on the basis of the teaching point information.

7. A robot controlled by the system according to claim 1.

8. The system of claim 1 further comprising:
   the robot controlled by the control device.

* * * * *